(12) United States Patent
Pittet et al.

(10) Patent No.: US 8,588,034 B2
(45) Date of Patent: Nov. 19, 2013

(54) GOVERNOR FOR A TIMEPIECE WHEEL SET OR STRIKE WHEEL SET

(75) Inventors: Jan Pittet, Le Lieu (CH); Jean-Jacques Born, Morges (CH); Thierry Conus, Lengnau (CH); Eric Goeller, Les Hôpitaux Vieux (FR); Patrick Ragot, Fontainemelon (CH); Sylvain Marechal, Bois-d'Amont (FR); Davide Sarchi, Renens (CH); Jérôme Favre, Les Bioux (CH)

(73) Assignee: Montres Breguet S.A., L'Abbaye (CH)

( * ) Notice: Subject to any disclaimer, the term of this patent is extended or adjusted under 35 U.S.C. 154(b) by 42 days.

(21) Appl. No.: 13/369,700

(22) Filed: Feb. 9, 2012

(65) Prior Publication Data

US 2012/0207001 A1 Aug. 16, 2012

(30) Foreign Application Priority Data

Feb. 11, 2011 (EP) .................................. 11154181

(51) Int. Cl.
*G04B 21/00* (2006.01)
(52) U.S. Cl.
USPC ........................................................ 368/243
(58) Field of Classification Search
USPC .................. 368/243, 223, 125–127, 139, 140,
368/168–178, 124, 158, 161; 84/94.1
See application file for complete search history.

(56) References Cited

U.S. PATENT DOCUMENTS

| 4,308,605 | A  | * | 12/1981 | Ayer ............................ 368/127 |
| 7,350,967 | B2 | * | 4/2008  | Jujo ............................. 368/175 |
| 7,891,862 | B2 | * | 2/2011  | Tu et al. ...................... 368/127 |

FOREIGN PATENT DOCUMENTS

| CH | 334 | 3/1889 |
| CH | 17747 | 8/1899 |
| CH | 701 227 A2 | 12/2010 |
| EP | 1 772 791 B1 | 3/2008 |
| EP | 2 153 922 A1 | 2/2010 |
| FR | 2 768 242 A1 | 3/1999 |

OTHER PUBLICATIONS

European Search Report issued Aug. 22, 2011, in European Application No. 11 15 4181, filed Feb. 11, 2011.
Masatoshi Moteki, et al., "Development of Spring Drive Sonnerie", Congrès International de Chronométrie, XP001551333, Sep. 26-27, 2007, pp. 115-118.

* cited by examiner

*Primary Examiner* — Edwin A. Leon
(74) *Attorney, Agent, or Firm* — Oblon, Spivak, McClelland, Maier & Neustadt, L.L.P.

(57) ABSTRACT

A timepiece wheel governor for regulating the pivoting speed ($\omega$) of a wheel set, about a pivot axis, including a pivoting inertia-block. It includes a spring to return this block towards this axis, and, when the wheel set pivots at a lower speed than a reference speed ($\omega c$), this block remains confined within a first volume of revolution, and, when the wheel set pivots at a higher speed than the reference speed ($\omega c$), this block is engaged, in one peripheral portion thereof, in a second volume contiguous with and external to the first one, this peripheral portion cooperating in this second volume with a regulator arranged to brake the wheel set and return the pivoting speed ($\omega$) thereof to the reference speed ($\omega c$), and to dissipate the surplus energy.

20 Claims, 9 Drawing Sheets

GOVERNOR FOR A TIMEPIECE WHEEL SET OR STRIKE WHEEL SET

This application claims priority from European Patent Application No. 11154181.9 filed Feb. 11, 2011, the entire disclosure of which is incorporated herein by reference.

FIELD OF THE INVENTION

The invention concerns a governor for a timepiece wheel set or strike wheel set, for regulating the pivoting speed of a wheel set about a first pivot axis, around a reference speed value, wherein said wheel set is driven, via transmission means, by an energy source delivering a mechanical torque, and said wheel set includes at least one inertia-block pivotally mounted about a primary pivot about a second pivot axis parallel to said first pivot axis and at a distance therefrom.

The invention also concerns a spring comprising an inertia governor for regulating the pivoting speed of a wheel set about a first pivot axis, around a reference speed value, wherein said wheel set is driven, via transmission means, by an energy source delivering a variable torque at a variable angular speed, said wheel set includes a main pivot or arbour about said first pivot axis, said wheel set includes at least one inertia-block pivotally mounted about a primary pivot about a second pivot axis parallel to said first pivot axis and at a distance therefrom, and said inertia-block includes a secondary pivot defining a third pivot axis parallel to said first pivot axis and said second pivot axis.

The invention further concerns a musical or striking mechanism for a timepiece or musical box, including an energy source or a barrel, and a means of transmitting mechanical torque from said energy source or said barrel to a wheel set for generating music or a strike wheel set.

The invention also concerns a timepiece or musical box including a wheel set for generating music or a strike wheel set.

The invention concerns the field of mechanical speed regulation for rotating assemblies.

More specifically, it concerns the field of horology, and more particularly timepieces including a striking mechanism or a musical mechanism, such as striking watches, musical boxes or suchlike.

BACKGROUND OF THE INVENTION

The manufacture of timepieces, or musical boxes including a musical movement and/or a striking mechanism with complications, requires the use of mechanisms having an operating regularity of comparable quality to that of the timepiece movement in which they are contained, at least during the course of a musical or striking cycle where, although an unchanging duration in the cycle time is not sought, the rhythm imposed on the musical or striking sequence must imperatively be observed. Indeed, any defect is audible and unpleasant for the user, especially if the timepiece is an expensive one.

An energy source, generally formed by a strike barrel, generally supplies energy to raise one or several hammers to strike gongs, resonators, or bells, or even a sound box in the case of a musical box. The vibration of these gongs or suchlike is transmitted to the middle part, bezels and crystal of the timepiece, which radiate in the air. The energy is generally called for by a cam or toothed device, such as a simple or multiple strike wheel set, actuated by a lever or a trigger device controlled by the timepiece movement or by the user in the case of an alarm clock function or alarm. The amount of energy used for winding a hammer is very high in comparison to that necessary for the operation of the timepiece movement. Also the energy source of the striking mechanism, generally a barrel spring, has to be generously dimensioned to avoid the user having to wind or recharge too frequently, whether the energy source is mechanical, electrical or of another type.

The energy used by the striking mechanism is characterized by instantaneous peaks in consumption, which also influences the large size of the energy source, to ensure fatigue resistance.

Moreover, it is not unusual for the striking mechanism to experience racing, under the combined effect, on the one hand of the abrupt release of a large amount of energy broadly available in the energy source, and on the other hand of inertia. The consequences are detrimental, in particular as regards the nature of the following striking sequence, which may be incorrect. Or the following strike may not occur at the right time, which is more serious.

To prevent racing in pendulums and clocks, it is known to use a fly which brakes the rotation by air friction. These devices require space and cannot be properly integrated in watches.

Regulation of the striking tempo, or melody as appropriate, is achieved by a governor, which stabilises the let down speed of the barrel used for the strike, which may be the barrel of the movement, or a separate barrel, as is generally the case in pendulums.

The known governors for striking mechanisms are thus based on friction, or on shocks. They are often difficult to make, imprecise as regards speed, and very often noisy, which is unacceptable for an expensive musical or grand strike timepiece.

Any regulation of this speed, when it exists, is conventionally achieved with a lever system or with a mechanical governor with inertia blocks such as that disclosed in CH Patent No. 34 in the name of Barbezat-Baillot, which use a good deal of energy and may be bulky. Known governors are imprecise, and cannot precisely limit angular speed deviation.

The most compact is the lever governor, which is easy to make and adjust, using a simple stop pin. Generally, this type of governor operates at high speed, at around 100 to 150 oscillations per second, which results in 200 to 300 shocks per second. These shocks generate vibrations which are transmitted to the middle part, bezels and the crystal, which radiate in the air, like the chimes of the strike, with a noise that interferes with the sound of the chimes.

Further, these shock or friction based governors are difficult to make, imprecise as regards the regulated speed, and often noisy.

In short, in a timepiece including a striking mechanism or a musical box, and particularly in a musical watch or in a minute repeater watch, the variation in tempo is closely connected to the let down curve of the barrel spring. Consequently, in many cases, the chimes or music slow down at the end of the function, which is unpleasant for the user. Known governors require a good deal of space and/or are noisy.

SUMMARY OF THE INVENTION

The invention proposes to overcome these drawbacks, and to propose a governor for a timepiece including a striking mechanism or a musical box and particularly for a musical watch or a minute repeater watch, which allows a constant speed to be obtained, while absorbing the differences in torque in a regulating train, and yet remains perfectly silent.

The invention thus proposes to provide a new solution to the problem of racing, particularly suited to watches.

In short, part of the energy released during a striking cycle is used to prevent racing.

In an innovative manner, the invention solves this problem by integrating a mechanism that uses energy. Therefore, the invention concerns a regulating device for a timepiece striking mechanism, which is arranged to regulate power consumption to a level that is exactly right for the striking mechanism, and which includes energy dissipating means for this purpose.

The invention therefore concerns a governor for a timepiece wheel set or strike wheel set, for regulating the pivoting speed of a wheel set about a first pivot axis, around a reference speed value, wherein said wheel set is driven, via transmission means, by an energy source delivering a mechanical torque, and said wheel set includes at least one inertia-block pivotally mounted about a primary pivot about a second pivot axis parallel to said first pivot axis and at a distance therefrom.

According to the invention, said governor includes a means of returning said at least one inertia block towards said first pivot axis, and said at least one inertia block is arranged such that, when said wheel set pivots at a speed lower than or equal to said reference speed, said at least one inertia block remains confined within a first internal volume of revolution about said first pivot axis, and also such that, when said wheel set pivots at a higher speed than said reference speed, said at least one inertia block is engaged, at least in one peripheral portion thereof, in a second volume of revolution about said first pivot axis, contiguous with and external to said first volume of revolution, and said peripheral portion cooperates in said second volume of revolution with regulating means arranged to brake said wheel set and return the pivoting speed thereof to said reference speed, and to dissipate the surplus energy.

According to a feature of the invention, said timepiece wheel set or strike wheel set governor includes a braking means which acts when said peripheral portion of the inertia blocks passes from said first volume to said second volume, said braking means being formed, either of air braking means, or of an aero brake deployed once the reference speed is exceeded, or dry braking means, or friction means with a surface applying a braking torque to said peripheral portion of said inertia blocks, or friction means with a surface applying a braking torque to the peripheral portion of the inertia blocks and arranged such that the braking torque applied intersects the radius from the first pivot axis.

According to a feature of the invention, said peripheral portion is electrically conductive, and said regulating means is formed by a means of generating at least one variable magnetic field comprising field lines oriented so that the interaction between said peripheral portion and said magnetic field generates eddy currents which brake said wheel set by resisting the pivoting thereof.

According to a feature of the invention, when said wheel set pivots at a speed lower than or equal to said reference speed, said return means is arranged to keep said at least one inertia block confined within said first internal volume of revolution and, also, when said wheel set pivots at a higher speed than said reference speed, to allow said at least one inertia block to engage, at least in a peripheral portion thereof, in said second volume of revolution.

According to a feature of the invention, said return means is a mechanical return means, and exerts a return force, in the direction of said first pivot axis, on a secondary pivot comprised in said at least one inertia block and defining a third pivot axis parallel to said first pivot axis and second pivot axis.

According to a feature of the invention, said return means is an elastic return means, which includes a first pivot guide about a main pivot or arbour comprised in said wheel set about said first pivot axis, and which includes at least a second pivot guide about said secondary pivot comprised in said at least one inertia block about said third pivot axis.

According to a feature of the invention, said wheel set includes a plurality of said inertia blocks arranged equidistantly about said first pivot axis, and said elastic return means includes a first pivot guide about a main pivot or arbour comprised in said wheel set about said first pivot axis, and includes a second pivot guide about said secondary pivot comprised in each said inertia block about said third pivot axis specific thereto.

According to a feature of the invention, said elastic return means is formed by at least one spring.

According to a feature of the invention, said spring includes a preload, corresponding to a radial travel of the second pivot guide thereof, in a radial direction relative to said first pivot axis, when said spring is guided by said first guide on said main pivot, between an uncoupled position of said spring and a coupled position of said spring on said secondary pivot of said inertia block, said wheel set and said inertia block being in the stopped position, and said preload, in the coupled position of said spring, drawing said secondary pivot of said inertia block radially towards said first pivot axis.

According to a feature of the invention, the rigidity of said spring is defined such that the value of the radial force applied to said inertia block, returned to said secondary pivot, is a substantially linear function of the angular position of said inertia block about said primary pivot on said second pivot axis, relative to the stopped position of said inertia block, and for which a zero value of said radial force corresponds, in absolute value, to said preload travel.

According to a feature of the invention, said spring is made of micro-machinable material, or silicon, or quartz or a compound thereof, or an alloy derived from MEMS technology, or an alloy obtained via the DRIE or LIGA methods, or made of an at least partially amorphous material.

According to a feature of the invention, said inertia blocks are made of electrically conductive material or gold, of copper or silver, or include, in the portion subjected to said magnetic field in said chamber, a portion made of electrically conductive material or gold, or of silver or copper, in a parallel direction to said first pivot axis.

The invention also concerns a spring for an inertia governor for regulating the pivoting speed of a wheel set about a first pivot axis, around a reference speed value, wherein said wheel set is driven, via a transmission means, by an energy source delivering a variable torque at a variable angular speed, said wheel set includes a main pivot or arbour about said first pivot axis, said wheel set includes at least one inertia block pivotally mounted about a primary pivot about a second pivot axis parallel to said first pivot axis and at a distance therefrom, and said inertia-block includes a secondary pivot defining a third pivot axis parallel to said first pivot axis and said second pivot axis, characterized in that said spring is arranged to exert a return force in the direction of said first pivot axis, on said secondary pivot, and to return said at least one inertia block towards said first pivot axis, and characterized in that said spring includes a first pivot guide about said main pivot and includes at least a second pivot guide about said secondary pivot of said at least one inertia block.

The invention further concerns a musical or striking mechanism for a timepiece or musical box, including an energy source or a barrel, and means for transmitting mechanical torque from said energy source or said barrel to a wheel set for generating music or a strike wheel set, characterized in that said transmission means drives at least one said wheel set comprised in said timepiece wheel set or striking wheel set governor.

The invention further concerns a timepiece or musical box including a wheel set for generating music or a strike wheel set, characterized in that it includes a musical or striking mechanism of this type, and/or a timepiece wheel set or strike wheel set governor of this type.

BRIEF DESCRIPTION OF THE DRAWINGS

Other features and advantages of the invention will appear upon reading the following description, with reference to the annexed drawings, in which.

DETAILED DESCRIPTION OF PREFERRED EMBODIMENTS

Figure 1:
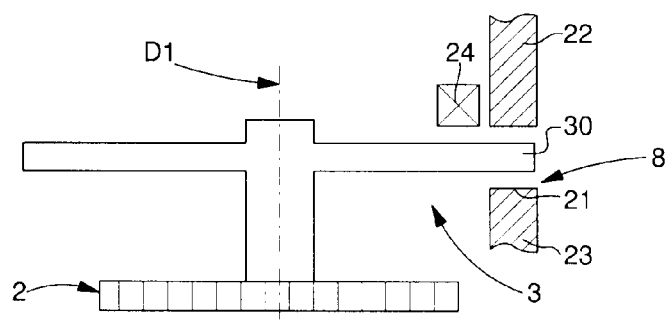
FIG. 1 shows a schematic side view of a timepiece wheel set or strike wheel set governor according to the invention.

The invention concerns the field of mechanical speed regulation for rotating assemblies.

The invention concerns in particular the field of horology, and more specifically that of timepieces including a striking mechanism, and will be more specifically described for this preferred application. However, the invention can be applied to pivoting speed regulation for any rotating assembly, whatever the scale thereof.

In this description of a preferred use of the invention, the invention concerns a regulating mechanism for a timepiece wheel set or strike wheel set 1, for a timepiece or musical box, which will be designated hereinafter by the generic term "timepiece".

This governor for a timepiece wheel set or strike wheel set 1 is intended to regulate the operation of a mechanism, and in particular in the particular application set out in detail hereinafter and illustrated by the Figures, a musical or striking mechanism 10. A "timepiece wheel set or strike wheel set governor 1" means hereinafter a governor for a timepiece wheel set, particularly for a strike wheel set or musical movement wheel set, and "striking mechanism 10" means a musical or striking mechanism. Those skilled in the art will know how to apply the invention to the regulation of other timepiece wheel sets.

The example application to a striking mechanism takes account of particular constraints, inherent in a regulation that must be very precise, preferably better than 3%, since any deviation is audible and unpleasant for the user, and a noise level that must remain very low relative to the acoustic volume of the chimes. The invention thus combines regulation precision and silence.

This striking mechanism 10 includes in a conventional manner an energy source or a barrel, and a means 3 of transmitting mechanical torque from the energy source or the barrel towards a wheel set for generating music or a strike wheel set, said generating wheel set being formed by hammers, levers or suchlike. This energy source, barrel or suchlike generally delivers a torque which varies as a function of the letting down of the spring. Naturally, governor 1 according to the invention, which will be described hereinafter, may also be used with an energy source delivering a torque that is assumed to be constant at a speed that is assumed to be constant, for the sole purpose of guaranteeing regulating speed precision, and preventing hazards such as shocks or suchlike.

The letting down of a barrel is associated with a significant decrease in torque as a function of time, for example, by a factor of around four. The variation in the residual torque envelope on the governor wheel set is due to the variation in the barrel load. High frequency torque peaks may be associated with charging musical blades. Due to their brief nature and the system inertia, these high frequency torque variations have little influence on speed level and are thus disregarded.

The quantity of energy received as torque at the user wheel set, in this case a strike wheel set, is thus very variable. The user wheel set is supplied the most regular energy possible, stabilising the pivoting speed of the wheel set on the one hand, and using the surplus energy at the start of the letting down of the barrel on the other hand.

Figure 15:
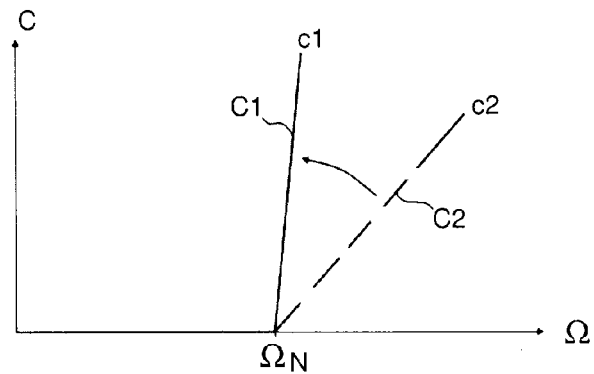
FIG. 15 is a curve showing braking torque as a function of pivoting speed, for two different types of speed governors.

The features of the desired speed governor, for a particular application, are a low speed variation (<3% of the nominal speed) and high power dissipation (>6 mW). Ideally, below the nominal speed, the braking torque induced by the governor should be zero. Above the nominal speed, braking torque as a function of speed must increase sharply. The higher this characteristic slope, the lower the variation in speed will be. FIG. 15 shows the typical torque characteristic of a speed governor. The curve in dotted lines is for a speed governor with high speed variation. Conversely, the curve in full lines decreases this speed variation, and has a high slope so as to decrease speed sensitivity relative to torque, which is what the invention proposes to achieve.

It is sought to obtain an energy dissipation characteristic as a function of time in the form of a power expressed in the relation $P=f(\omega^n)$, where $n>2$, the value $n=2$ corresponds to a power homogeneous to the square of the torque, and thus proportional to the square of the angular speed. The invention therefore proposes to improve this dissipation as much as possible.

In order to achieve this in an optimum manner, in a first variant, the invention implements the use of inertia blocks which can pivot relative to a wheel set powered by the energy source, via a transmission means and/or return means, particularly an elastic return means. In a second variant, the invention implements the use of eddy currents created by the interaction between these inertia blocks and a variable magnetic field, which allow the surplus energy to be used, by releasing heat, without however using more energy than necessary.

Preferably, the invention combines the use of these pivoting inertia blocks returned by a return means, and the use of eddy currents created by the interaction between the inertia blocks and a variable magnetic field.

The invention therefore creates passively regulated braking, which is efficient despite the constraints of the small volume available in a timepiece movement.

In another embodiment of the invention, the use of pivoting inertia blocks is combined with a means of compensating for centrifugal force, and with a braking means.

The timepiece wheel set or strike wheel set governor 1 is devised to regulate the pivoting speed ω of a wheel set 3 about a first pivot axis D1 around a reference speed value ωc. This wheel set 3 is driven, via a transmission means 2, by an energy source that delivers a mechanical torque. This wheel set 3 includes at least one inertia block 4 pivotally mounted about a primary pivot 6 defining a second pivot axis D2, parallel to the first pivot axis D1 and at a distance therefrom.

According to the invention, governor 1 includes a means 6 of returning an inertia block 4 towards the first pivot axis D1. This inertia block 4 is arranged such that:
  on the one hand, when wheel set 3 pivots at a speed lower than or equal to the reference speed ωc, the inertia block 4 remains confined within a first volume of revolution VI about the first pivot axis D1;
  and on the other hand, when wheel set 3 pivots at a higher speed than the reference speed ωc, this inertia block 4 is engaged, at least on a peripheral portion 30 thereof, in a second volume of revolution VE about the first pivot axis D1 contiguous with the first volume of revolution VI.

Figure 14:
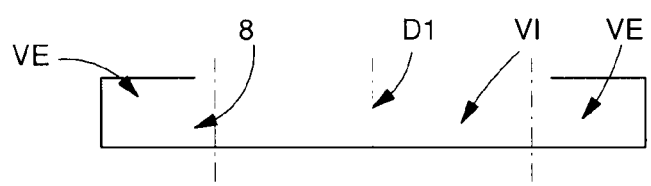
FIG. 14 shows schematically in a cross-section through the first pivot axis of the wheel set, the different volumes of revolution of the inertia blocks included therein.

In a first configuration, seen in FIG. 14, the second volume VE is external to the first volume VI.

In a second configuration, not shown in the Figures, the second volume VE is internal to the first volume VI.

Naturally, other configurations are possible, with a plurality of adjacent volumes, which each have particular properties for interacting or not interacting with inertia block 4.

The peripheral portion 30 cooperates in the second volume of revolution VE with a regulating means arranged to cause the braking of wheel set 3 and to return the pivoting speed ω thereof to the reference speed ωc, and to dissipate the surplus energy.

In a particularly advantageous manner specific to the invention, when wheel set 3 pivots at a speed lower than or equal to the reference speed ωc, return means 7 is arranged to keep this at least one inertia block 4 confined within the first internal volume of revolution VI and, also, when wheel set 3 pivots at a higher speed than reference speed ωc, to allow said inertia block 4 to be engaged, at least on a peripheral portion 30 thereof, in the second volume of revolution VE.

Preferably, return means 7 is a mechanical return means, and exerts a return force in the direction of first pivot axis D1, on a secondary pivot 72, comprised in said at least one inertia block 4 and defining a third pivot axis D3 parallel to the first pivot axis D1 and second pivot axis D2.

Advantageously, return means 7 is an elastic return means, which includes a first pivot guide 74 about a main pivot 15 or arbour comprised in said wheel set 3 about the first pivot axis D1, and which includes at least a second pivot guide 73 about secondary pivot 72 comprised in said at least one inertia block 4 about the third pivot axis D3.

As will be explained hereinafter, this elastic return means 7 preferably includes at least one spring 71 with a preload. The precise manufacture of these springs, with a preload precisely calculated according to the reference speed to be maintained, overcomes the problems of imprecision of the prior art. The combination with eddy current dissipation very quickly provides a stabilised rate, by dissipating a large quantity of energy in a very short time.

In a particular embodiment, the timepiece wheel set or strike wheel set governor 1 includes a braking means which acts when the peripheral portion 30 of inertia blocks 4 passes from first volume VI to second volume VE. This braking means is formed, either of air braking means, or an aero brake deployed above the reference speed ωc, or a dry braking means, or friction means with a braking torque surface applied to the peripheral portion 30 of inertia blocks 4 and arranged such that the braking torque applied intersects the radius from the first pivot axis D1.

Thus, the braking means acts when the peripheral portion 30 of inertia blocks 4 passes from the first volume VI to the second volume VE to apply a braking torque to peripheral portion 30 of inertia blocks 4 so that the braking torque applied intersects with the radial position of each said inertia block from the first pivot axis D1, at the centre of second volume VE.

The preferred energy dissipation principle, illustrated by the Figures, is that of eddy current losses. An electrically conductive wheel set, particular a disc, or similar, pivoting in a variable, or alternate magnetic field, is the seat of induced eddy currents, which cause Joule effect losses in accordance with the following expression:

$$P\_\{eddy\} = \rho \cdot B C^2 \cdot \Omega^2 \cdot e, \qquad (2.1)$$

where ρ is the electric resistivity of the pivoting conductive material, BC the induction peak seen by the material, Ω the pivoting speed, and e the thickness thereof,
and the eddy current braking torque can be expressed as:

$$M\_\{eddy\} \approx \rho \cdot BC^2 \cdot \Omega \cdot e \qquad (2.2)$$

In a very simple embodiment of the invention, the speed governor studied includes an electrically conductive disc or wheel set, for example made of silver, pivoting in a variable, preferably alternate, magnetic field, the braking torque of which obeys expression 2.2.

The torque-speed relationship of this system is a purely linear characteristic, the slope of which depends upon parameters ρ, $BC^2$ and e.

Figure 4:
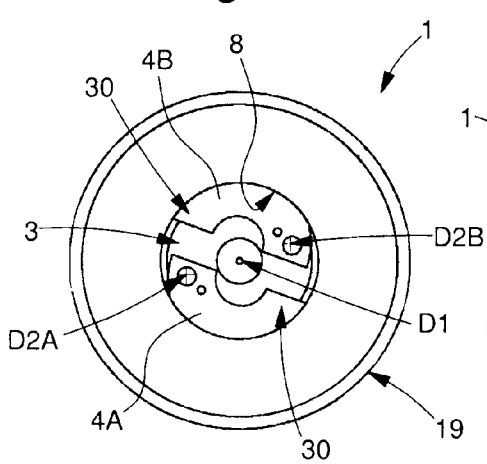
FIG. 4 shows a schematic top view of a governor of the first embodiment, with inertia blocks moving in an annular chamber.

This system has, however, a nominal speed braking torque. Further, the slope can be adjusted by the aforecited parameters but with limit values. Indeed, resistivity has a minimal value for silver. The induction value cannot be indefinitely increased either. Thus, it is difficult to obtain very steep slopes in acceptable volumes, which leads to the consideration of a preferred embodiment of the invention, as shown in FIG. 4.

The timepiece wheel set or strike wheel set governor 1 according to the invention is devised to regulate the pivoting speed ω of at least one user wheel set about a first pivot axis D1, around a reference speed value ωc. The timepiece wheel set or strike wheel set governor 1 includes at least one wheel set 3 which is arranged to be pivoted by transmission means 2 about said first pivot axis D1.

As seen in FIG. 1, this wheel set 3 directly or indirectly includes at least one peripheral portion 30 made of electrically conductive material, and at least when wheel set 3 is not in the stopped position, at least one part of this peripheral portion 30 is subjected to the action of at least one variable magnetic field in a chamber 8, comprised in governor 1, at least partially delimited by magnetised parts, comprised in governor 1, or in a slot 21 between magnetic poles 22 and 23.

Driven by torque transmission means 2, wheel set 3 pivots and this peripheral portion 30 is moved into the variable magnetic field, particularly in said chamber 8 in a preferred embodiment, so that the pivoting speed of wheel set 3 is regulated by eddy currents induced by the interaction between said field and said peripheral portion 30, or said peripheral portions 30 if wheel set 3 has several said fields, as in the preferred case of FIGS. 2 to 9 and 11 to 13.

Indeed, when wheel set 3 pivots, there is created, in the conductor formed by peripheral portion 30, an electric current which tends to resist the relative movement between the wheel set and the magnetic field, in accordance with the eddy current braking principle, and the braking torque increases when the constant surface speed increases. Naturally, if the peripheral surface 30 of the wheel set increases, the braking torque also increases. When the various elements of governor 1 are properly dimensioned, the letting down speed of a barrel forming the energy source is properly stabilised by governor 1. Wheel set 3 is synchronous with the wheel set generating music or strike wheel set, the tempo of which is thus well regulated.

In a preferred version of the invention, as seen in FIGS. 2 to 9, wheel set 3 includes at least one inertia block 4, and preferably a plurality of said inertia blocks 4, each pivotally mounted about an off-centre primary pivot 6, fixed to wheel set 3, particularly on a pivoting flange 31, directly or indirectly driven by transmission means 2 and defining a second pivot axis D2 parallel to the first pivot axis D1 and at a distance therefrom. It is clear that, in the case of a plurality of inertia blocks 4A, 4B, . . . , each one pivots about a respective second axis D2A, D2B, . . . . The pivoting of each inertia block 4 occurs, in guide means 5, such as a bore, in cooperation with complementary guide means 6, such as a pin, comprised in wheel set 3, or vice versa.

Preferably, the centre of inertia of each inertia block 4 is further from the first pivot axis D1 than primary pivot 6 of the inertia block 4 concerned.

According to the invention, in the preferred version where the dissipation of energy uses eddy currents, at least one peripheral portion 30 of each inertia block 4, or the entire inertia block 4 is made of electrically conductive or respectively magnetised material.

According to the invention, at least one part of each inertia block 4 forms a peripheral portion 30 and, at least when the inertia block 4 concerned is not in the rest position, and preferably beyond a certain pivoting speed threshold of wheel set 3, in the case where at least a peripheral portion 30 of each inertia block 4 is made of electrically conductive material, is preferably subjected to the action of at least one variable, or alternate or sinusoidal magnetic field, in a chamber 8 in which inertia block 4 is moved, so that the pivoting speed of wheel set 3 is regulated by the action of eddy currents induced by the interaction between chamber 8 and peripheral portion 30 of inertia block 4.

In the alternative case where the at least one peripheral portion 30 of each inertia block 4 is made of magnetised material, the pivoting movement of wheel set 3 and thus of inertia block 4 creates a variable, or alternate or sinusoidal magnetic field in a chamber 8 at least partially delimited by conductive parts, the interaction of which with said magnetic field generates eddy currents which tend to brake the wheel set by resisting the pivoting thereof.

This inertia block 4 must experience or respectively generate a magnetic field of variable amplitude. Naturally, if the field is alternate, the variation amplitude is even greater, and the conditions are optimal. However, it should be noted that a simple variation in the magnetic field between non-magnetised areas, with zero field, on the one hand, and areas subjected to the action of magnets, on the other hand, also creates the eddy current dissipation conditions required by the invention.

In an embodiment that is described in more detail hereinafter, the peripheral portion 30 is electrically conductive, and the speed regulating means is formed by a means of generating at least one magnetic field including field lines, which are oriented so that the interaction between this peripheral portion 30 and the variable magnetic field generates eddy currents which tend to brake wheel set 3 by resisting the pivoting thereof.

Those skilled in the art will know how to achieve the reverse configuration wherein peripheral portion 30 is made of magnetised material, and where chamber 8 includes conductive surfaces and this alternative embodiment is consequently not detailed in this description.

According to the invention, this inertia block 4, and preferably each inertia block 4, is arranged so that, on the one hand, when wheel set 3 pivots at a speed lower than or equal to the reference speed ωc, this inertia block 4 remains confined within a first volume of revolution VI about the first pivot axis D1, and on the other hand, is also arranged so that, when wheel set 3 pivots at a higher speed than the reference speed ωc, this inertia block 4 is engaged, at least in a peripheral portion 30 thereof, in a second volume of revolution VE about the first pivot axis D1 contiguous with and preferably external to the first volume of revolution VI. The peripheral portion 30 cooperates in the second volume of revolution VE with a regulating means arranged to cause the braking of wheel set 3 and to return the pivoting speed ω thereof to the reference speed ωc, and to dissipate the surplus energy.

It is clear that the device can also operate in a second configuration, where the second volume VE is internal to the first volume VI, which is however less efficient than the first configuration where the second volume VE is external to first volume VI, since there is less dissipation.

In this second configuration, it is possible to make inertia block 4 in the form of a lever inertia block, with a relatively large mass on a first lever arm, subjected to the peripheral centrifugal force, and a conductive part, of less inertia, on a second lever arm, in proximity to the pivot axis of the wheel set.

According to the invention, governor 1 includes a means 7 of returning at least one inertia block 4 and preferably each inertia block 4 when the governor has several, towards this first pivot axis D1.

Thus, each inertia block 4 is returned towards the first pivot axis D1 by return means 7, preferably by an elastic return means 7. Each inertia block 4 is mobile between, on the one hand a folded down rest position corresponding to a stopped position of wheel set 3, and on the other hand a maximum deployed off-centre position corresponding to the highest pivoting speed of wheel set 3, the peripheral portion 30 of each inertia block 4 tending to move away from the first pivot axis D1 under the action of centrifugal force.

Preferably, this elastic return means 7, formed in particular by at least one spring 71, connects each inertia block 4 to the first pivot axis D1, or to flange 31, or to another inertia block 4. Advantageously, according to the invention, the elastic return means 7 has a preload, which is determined to enable inertia blocks 4 to move off-centre when the nominal speed ωc is reached. The rigidity of elastic return means 7, particularly springs 71, is calculated so as to compensate for the centrifugal force of inertia blocks 4 in any angular position of said blocks.

Figure 2:
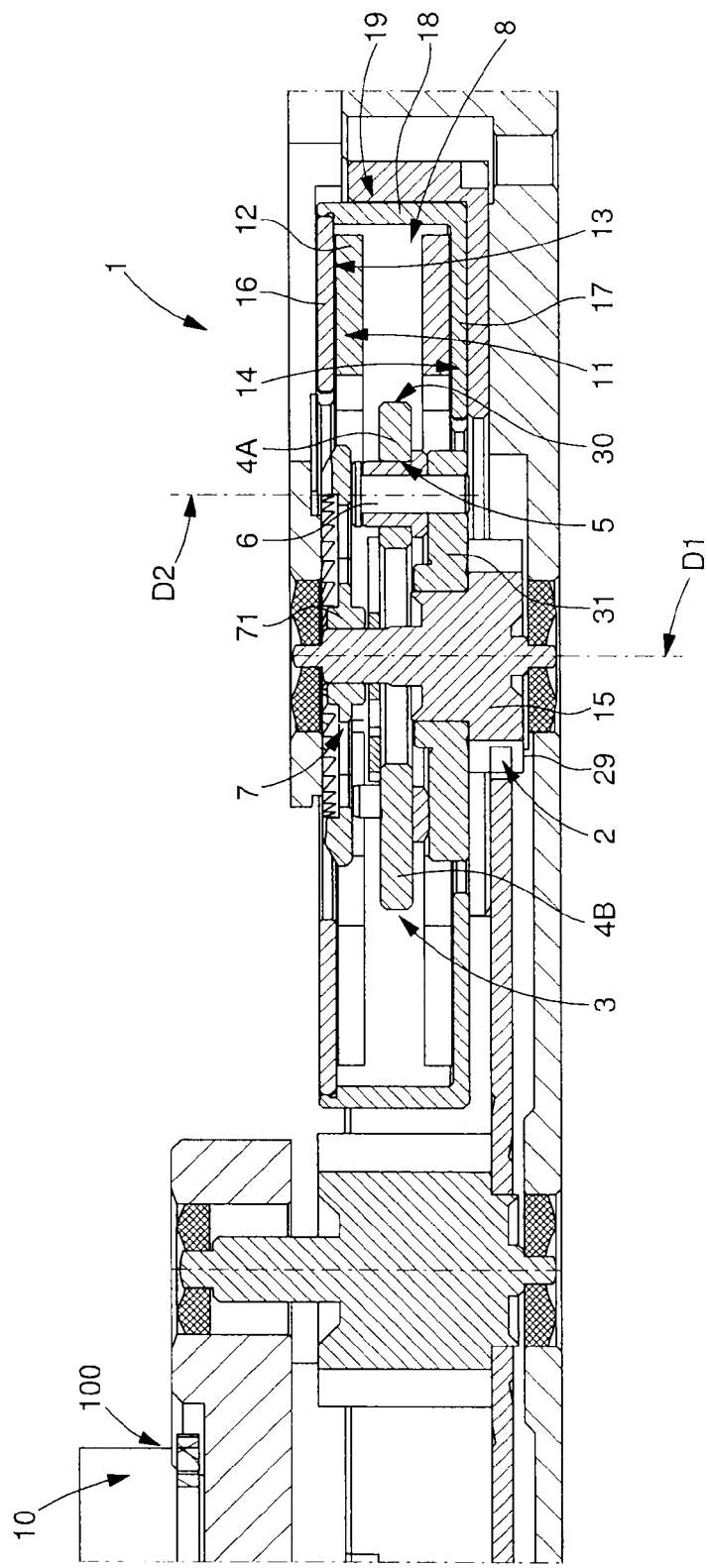
FIG. 2 shows a schematic cross-section, passing through a first pivot axis, of a first embodiment of a timepiece wheel set or strike wheel set governor of the invention, integrated in a partially shown striking mechanism which is integrated in a partially shown timepiece.
Figure 6:
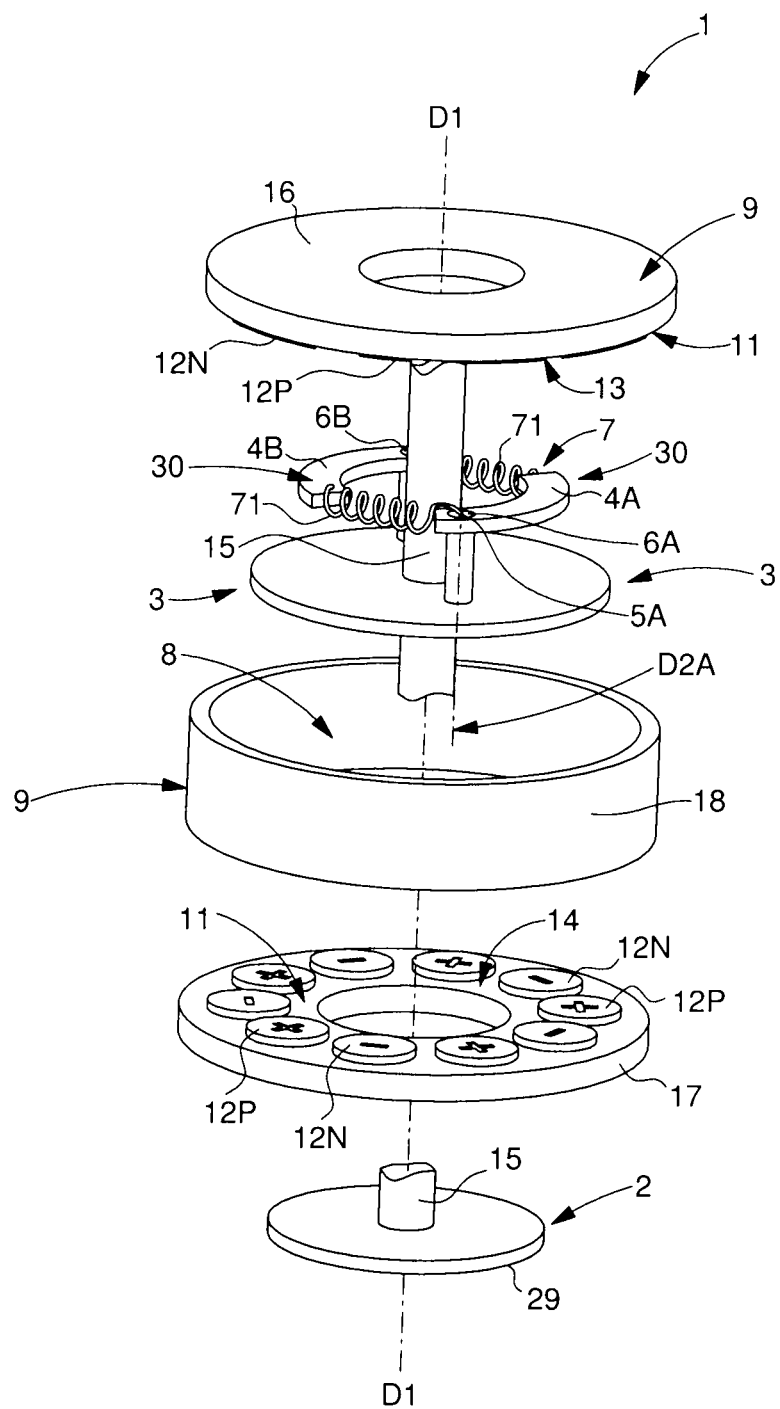
FIG. 6 shows an exploded view of the governor of FIG. 4, fitted with means of elastically returning the inertia blocks in accordance with a first variant.
Figure 7:
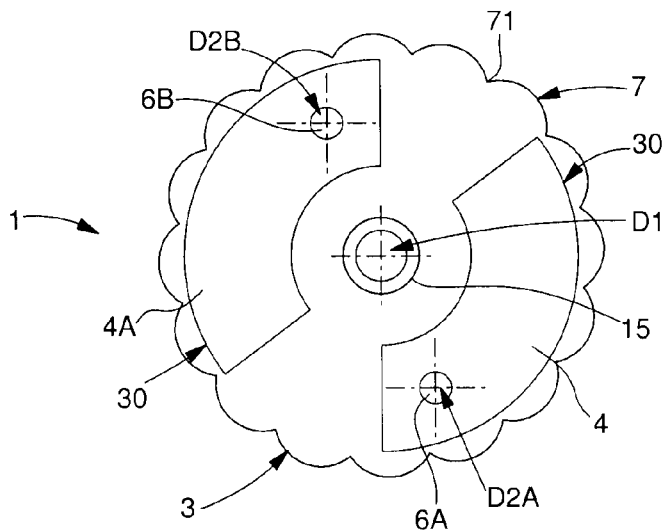
FIG. 7 shows a partial, schematic, top view of the governor of FIG. 4, fitted with means of elastically returning the inertia blocks in accordance with a second variant.
Figure 8:
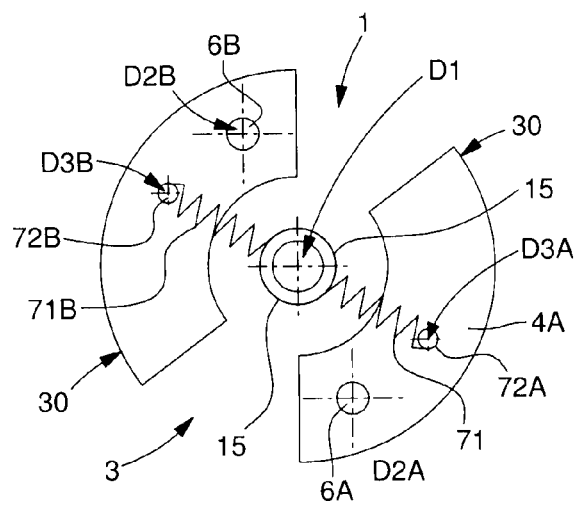
FIG. 8 shows a partial, schematic, top view of the governor of FIG. 4, fitted with means of elastically returning the inertia blocks in accordance with a third variant.
Figure 9:
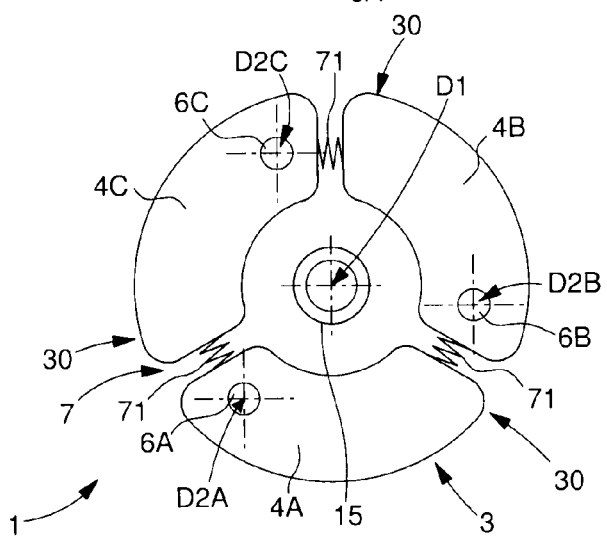
FIG. 9 shows a partial, schematic, top view of the governor of FIG. 6, with a different number of inertia blocks.
Figure 13:
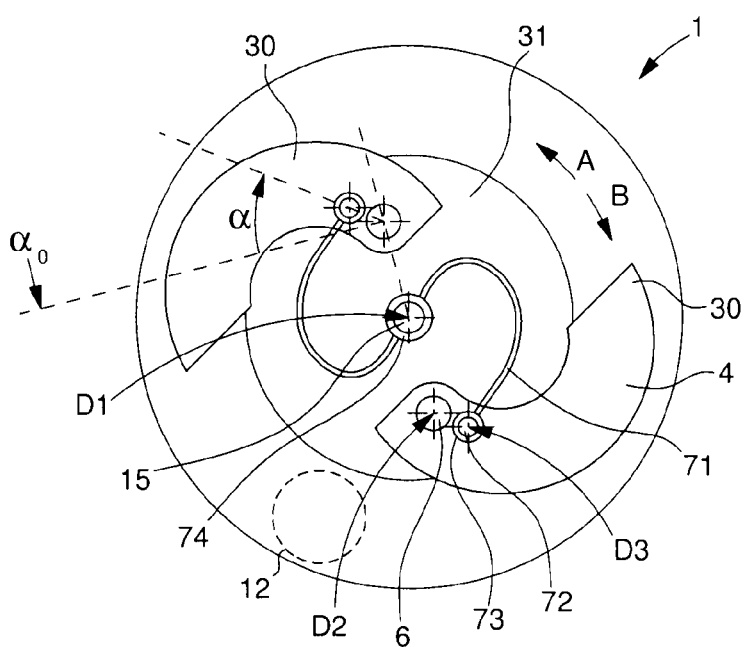
FIG. 13 shows the mechanism of FIG. 11, with the return means coupled to the inertia blocks, with the wheel set shown pivoting with its inertia blocks in the deployed position.

Below the nominal speed ωc, inertia blocks 4 remain in a folded down position in proximity to the first pivot axis D1, and are outside the magnetic field that is exerted in a chamber 8. The field is created by one or more magnets 12, mounted on a stator yoke 19, on yoke flanges 16, 17, as seen in FIGS. 2, 6 and 13.

When the nominal speed ωc is reached, inertia blocks 4 move off-centre and enter the magnetic field created by permanent magnets 12.

The eddy current braking increases as a function of the angular position of inertia blocks 4 on their respective pivot. Thus, elastic return means 7, particularly springs 71, are dimensioned so that, when nominal speed ωc is reached, a slight variation in speed greatly varies the braking torque. The rigidity of this spring 71 must be slightly greater than the rigidity required simply to balance the centrifugal force in any angular position. A certain self-regulating speed stability is thus ensured for the system.

Thus, the invention only creates the conditions for radial mobility of inertia blocks 4 above a reference speed ωc. To achieve this, a means of radial return towards the axis of the mechanism, in the form of preloaded springs 71, forms a particularly reliable solution: this spring exactly compensates, at the point of application thereof to a pivoting inertia block 4, for the centrifugal force applied to said block, at reference speed ωc.

Figure 16:
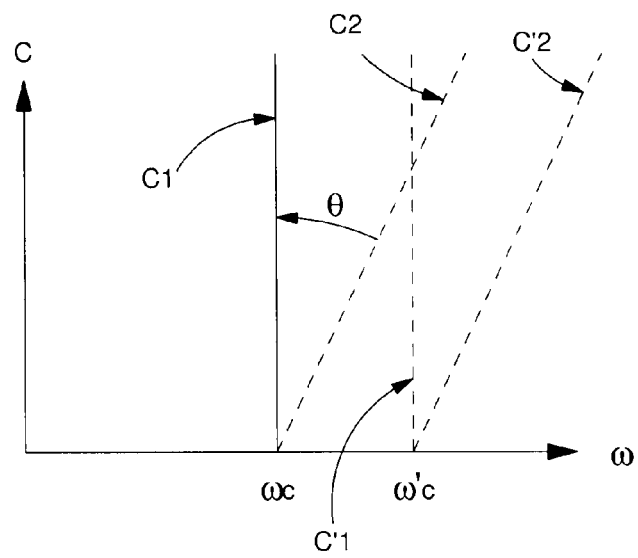
FIG. 16 illustrates the appearance of the braking torque curves C as a function of pivoting speed ω, for two different regulating features.

The curve in FIG. 16 illustrates the appearance of a braking torque curve C as a function of pivoting speed ω. Curve C1 is the ideal theoretical curve, all of the power is used at reference speed ωc alone. Curve C2 is the real curve, which is shifted by an angle θ from the preceding curve. This angle θ has to be minimised in order to come as close as possible to the ideal solution. The more rigid the spring, the greater angle δ will be. The advantage is to use a spring 71 of sufficiently low rigidity to have a very steep characteristic curve: thus a small increase in pivoting speed above reference speed θ results in a large radial travel of the corresponding inertia block 4, and in the dissipation of a large quantity of energy, which is proportional to the surface of the inertia block 4 which is interacting with a variable magnetic field to generate eddy currents. More particularly, this magnetic field is generated in a peripheral annular chamber 8, so that regulation is efficient regardless of the angular position of the wheel set to be regulated.

Taking the example of a barrel as shown in the Figures, it must be possible to dissipate several mW, around 5 mW, for regulation at around 3000 revolutions per minute. Implementation of the invention with the sizing proportions of the components in FIG. 2, and the choice of an ad hoc variable magnetic field, allows dissipation of 8 mW, which is particularly advantageous.

In the embodiment of FIG. 2, a strike train drives a regulating pinion 29, thus forming the torque transmission means 2. Wheel set 3 includes a flange 31 which carries two inertia blocks 4A, 4B each freely mounted on a pin 6, in a bore 5 comprised in each inertia block 4. In this Figure, inertia blocks 4A, 4B are connected to each other by a spring 71, which forms return means 7, and which is freely mounted on an arbour 15 comprised in wheel set 3 carrying the regulating pinion. The depth of penetration of inertia blocks 4 under the magnets 12, which generate variable magnetic field 8, varies as a function of the pivoting speed of the wheel set. The greater the depth of radial penetration of peripheral portion 30 of inertia blocks 4, the greater the braking torque induced by the eddy currents will be.

Preferably, as seen in FIGS. 4 to 13, governor 1 and in particular wheel set 3 includes a plurality of inertia blocks 4. The inertia blocks are preferably distributed around the first pivot axis D1 so as to dynamically balance the assembly formed of wheel set 3 and inertia blocks 4 at the maximum pivoting speed of wheel set 3.

When wheel set 3 pivots at a speed lower than or equal to the reference speed ωc, return means 7 is arranged to keep this or each inertia block 4 confined within the first internal volume of revolution VI and, also, when wheel set 3 pivots at a higher speed than reference speed ωc, to allow said inertia block 4 to be engaged, at least on a peripheral portion 30 thereof, in the second volume of revolution VE.

Return means 7 is preferably a mechanical return means, and exerts a return force, in the direction of the first pivot axis D1, on a secondary pivot 72 comprised in each inertia block 4 and defining a third pivot axis D3 parallel to the first pivot axis D1 and second pivot axis D2.

Preferably, the secondary pivot 72 of each inertia block 4 is further from the first pivot axis D1 than the primary pivot of the inertia block 4 concerned.

Figure 11:
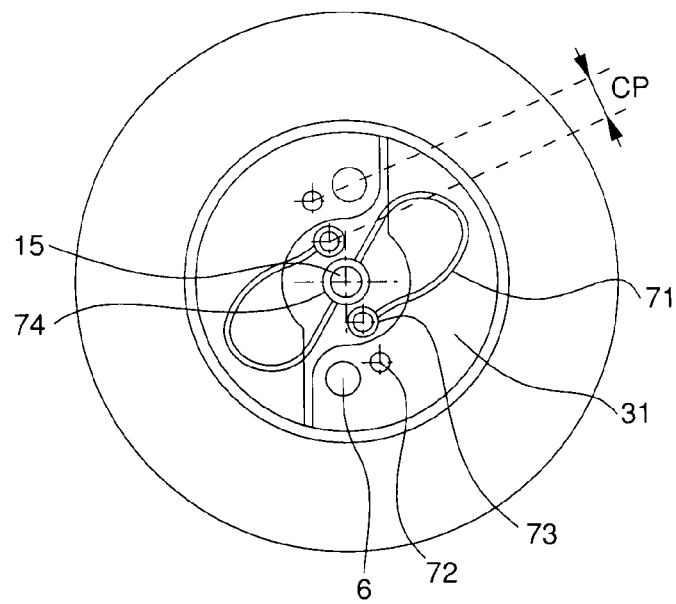
FIG. 11 shows a partial, schematic, top view of the governor of FIG. 8, fitted with means of elastically returning the inertia blocks in accordance with a second variant, in a preferred embodiment of said return means, which is shown in the uncoupled state, not coupled to the inertia blocks which it is their function to return.
Figure 12:
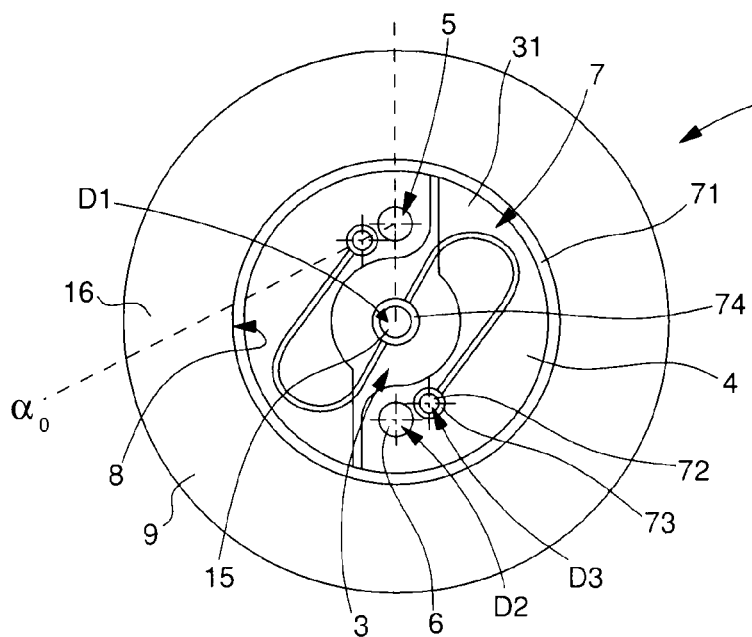
FIG. 12 shows the mechanism of FIG. 11, with the return means coupled to the inertia blocks, with the wheel set shown stopped.

Preferably, return means 7 is an elastic return means, and includes a first pivot guide 74 about a main pivot 15 or arbour comprised in wheel set 3 about the first pivot axis D1, and includes at least a second pivot guide 73 about secondary pivot 72 or about each secondary pivot 72 when radial elastic return means 7 is common to all of inertia blocks 4, as seen in FIGS. 11 to 13.

Thus the effect of elastic return means 7 is to keep inertia blocks 4 in proximity to axis D1 when wheel set 3 is stopped, and to limit the pivoting of inertia blocks 4 about their respective second pivot axis D2 as wheel set 3 picks up speed, in the transitory phase where the regulating eddy currents start to be created. The design of elastic return means 7 determines a reference speed, above which centrifugal force takes precedence over the return force, and moves inertia blocks 4 away from axis D1, enabling said blocks or at least the peripheral portion 30 thereof, to enter the magnetic field of chamber 8. This reference speed is preferably equal to the reference pivoting speed ωc of wheel set 3. It is then that the eddy currents induced in inertia blocks 4 brake said blocks and convert the kinetic energy into calorific energy. Preferably, this elastic return means 7 is formed by one or several springs 71. By properly sizing each spring 71 and the position of attachment between the inertia blocks 4 and their support, it is possible to obtain a pivoting speed for the deployed position of inertia blocks 4, which is slightly higher than the pivoting speed for the folded down position of the inertia blocks. This difference in speed equates with the speed regulating precision of governor 1. According to the torque, the depth of penetration of inertia blocks 4 into the magnetic field varies to dissipate more or less energy.

Elastic return means 7 also has the effect, when there are several inertia blocks, of balancing the effects and positions of said blocks. Indeed, preferably, wheel set 3 has a plurality of inertia blocks 4 distributed equidistantly around the first pivot axis D1. Elastic return means 7 also includes a first pivot guide 74 about a main pivot 15 or arbour comprised in wheel set 3 about the first pivot axis D1, and includes a second pivot guide 74 about said secondary pivot 72 comprised in each inertia block 4 about the third pivot axis D3 specific thereto.

Preferably, these inertia blocks 4 are identical to each other, the respective second pivot axes D2 thereof are at the same distance from the first pivot axis D1, and distributed equidistantly, and all the elastic return means 7 are identical and fixed in a similar manner to inertia blocks 4. Advantageously, these inertia blocks 4 are distributed about the first pivot axis D1 so as to dynamically balance the assembly formed of wheel set 3 provided with inertia blocks 4 at the maximum pivoting speed of wheel set 3.

Preferably, return means 7 is confined within the first volume of revolution VI, as well as secondary pivots 72, regardless of the position of inertia block or blocks 4.

Naturally, different variants can be envisaged.

Figure 3:
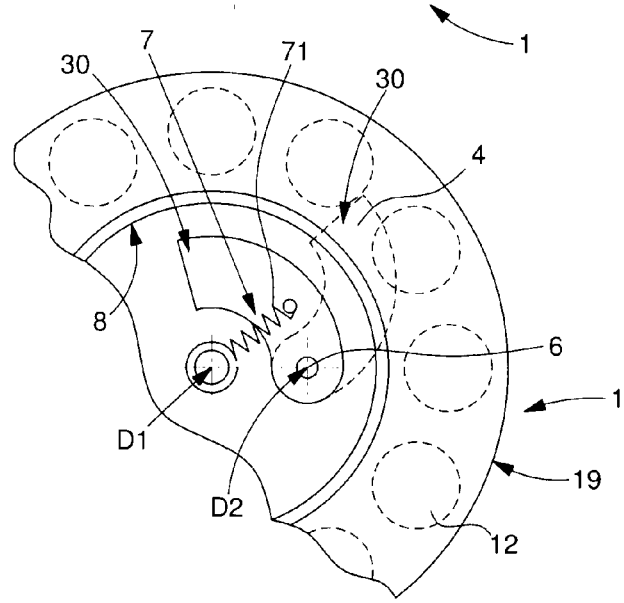
FIG. 3 shows a schematic top view of part of the governor of FIG. 2, and a moving inertia block comprised in said governor, in a first folded down position in full lines, and in a second deployed position in dotted lines.

In the first variant of FIG. 3, inertia blocks 4, here two inertia blocks 4A and 4B, are connected in pairs by elastic return means 7, which are sized so as to dynamically balance the assembly formed of wheel set 3 and inertia blocks 4 at the maximum pivoting speed of wheel set 3.

In the second variant of FIG. 4, the inertia blocks 4 are all connected to each other by a single elastic return means 7, which is sized so as to dynamically balance the assembly formed of wheel set 3 and inertia blocks 4 at the maximum pivoting speed of wheel set 3.

Figure 5:
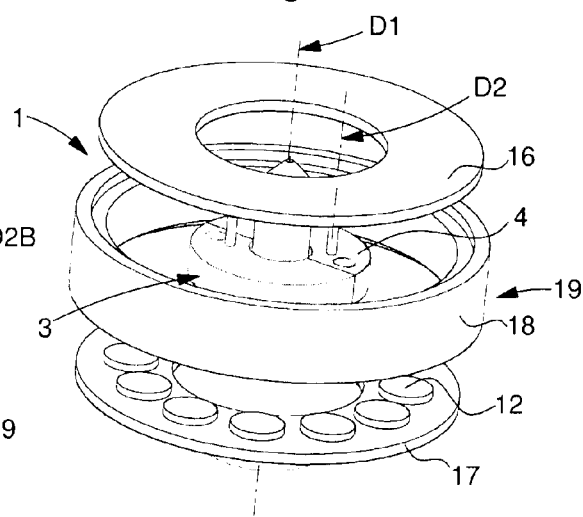
FIG. 5 shows an exploded view of the governor of FIG. 4.

In the third variant of FIG. 5, inertia blocks 4 are each connected by an independent elastic return means 7 to an arbour 15 comprised in wheel set 3 along the first pivot axis D1. These elastic return means 7 are dimensioned so as to dynamically balance the assembly formed of wheel set 3 and inertia blocks 4 at the maximum pivoting speed of wheel set 3.

The preferred embodiment, illustrated in FIGS. 11 to 13, is formed by combining the second and third variants.

It is clear that the difficulty is to arrange inertia blocks 4 and return means 7 so that the inertia blocks can only be deployed beyond a certain speed. The invention proposes an innovative solution, wherein the elastic return means 7 is formed by at least one spring 71 which includes a preload. A comparison of FIGS. 11 and 12 shows that this preload corresponds to a radial preload travel CP of the second pivot guide 73, in a radial direction relative to the first pivot axis D1, when spring 71 is guided by its first guide 74 on main pivot 15, between an uncoupled position of spring 71 and a position where the spring is coupled onto the secondary pivot 72 of inertia block 4, wheel set 3 and inertia block 4 being in the stopped position, and the preload tending, in the coupled position of spring 71, to draw secondary pivot 72 of inertia block 4 radially towards the first pivot axis D1.

Spring 71 is made so that the return force on the inertia block always passes through the first pivot axis D1, as seen in FIGS. 11 to 13, where the first guide 74 is an eye pivotally fitted without friction about main pivot 15.

In short, the preload exerts a radial return force on the secondary pivot 72 of the inertia block, which resists the centrifugal force applied thereto due to the pivoting speed, and this preload also prevents deployment of inertia blocks 4 before wheel set 3 has reached the critical speed, which is preferably selected at the reference speed value ωc.

Figure 17:
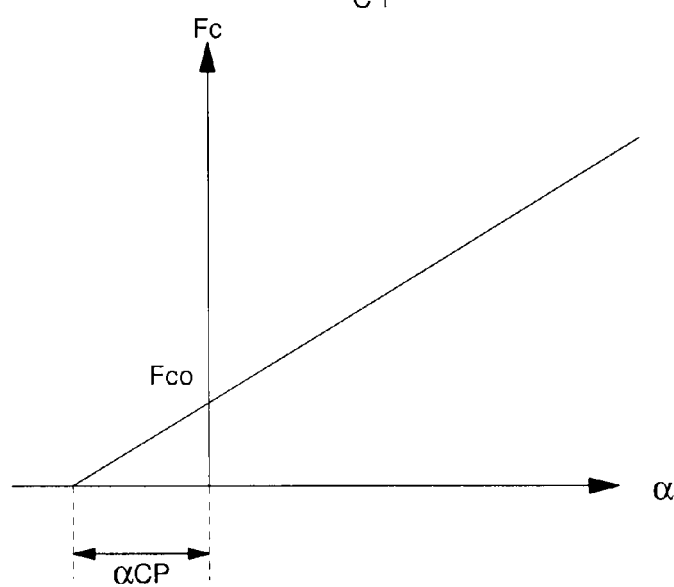
FIG. 17 is a curve which represents the variation in radial return force as a function of angle α which is the variation, relative to a rest position, in the position of an attachment arbour of the inertia block return means comprised in the governor according to the invention, relative to the pivot axis of said inertia block.

The rigidity of said spring 71 is defined so that the radial force value applied to inertia block 4, returned to secondary pivot 72, is a substantially linear function of the angular position α of inertia block 4 about primary pivot 6 on the second pivot axis D2, relative to the stopped position of inertia block 4, and for which a zero radial force value corresponds, in absolute value, to the preload travel CP, as seen in FIG. 17, which represents the variation in radial return force as a function of angle α which is the variation in position, relative to the rest position of FIG. 12, of the third pivot axis D3 relative to the second pivot axis D2.

In another expression, the radial force applied to the inertia block, beyond the preload travel CP of the spring, is a linear function of the radial position of secondary pivot 72 relative to the pivot axis D1. It is also a linear function of the distance, at any given time, between the position of secondary pivot 72, and the position of the point of attachment of the spring, not assembled on inertia block 4, as seen in FIG. 11, or more simply expressed, of the distance by which spring 71 extends. When the spring is coupled to inertia block 4, as in FIG. 12, this distance is equal to the radial preload travel CP.

This characteristic of an increase in radial force applied to inertia block 4 that is substantially proportional to the increase in radial position of its secondary pivot 72, is the result of an approximation by smoothing a curve obtained by calculating the centrifugal force balance whatever the angle of the inertia block.

An additional effect is obtained by the particular arrangement of the pivots in relation to each other, to obtain a variable lever arm, which allows a wide deployment of inertia block 4 for a small increase in speed above reference speed ωc.

The arms of spring 71 may advantageously be made in coiled or spiral form, in order to make the spring sufficiently flexible to obtain the exact rigidity required.

Preferably, in order to obtain perfect repeatability and perfect reproducibility of phenomena, spring 71 is made in a micro-machinable material, or silicon, or quartz or a compound thereof, or an alloy derived from MEMS technology, or an alloy such as that obtained by the DRIE or LIGA methods, or in an at least partially amorphous material. This method and/or choice of material also provides a non magnetic and non magnetisable spring 71, which cannot be influenced by the magnetic field, or diffuse it to the timepiece movement which surrounds governor 1. The other advantage is that the Young's modulus of the spring varies very little with temperature and there is therefore no deviation from the regulating speed.

Naturally, spring 71 may also be manufactured in a conventional manner, with a spring material, particularly spring steel, used in horology for a mainspring or barrel spring, for example.

It may however be desirable to regulate the reference speed. This is possible by modifying either the rigidity of the spring, or its preload, or both. Therefore, it is possible to arrange the mechanism with a static element such as an index, for example for pivoting an intermediate flange (not shown in the Figures), to shift the curve, as seen in FIG. 16 where a characteristic C'2 is substituted for a characteristic C2, by performing a zero offset that corresponds to another reference speed value. The use of this index in the factory allows precise adjustment to the desired value. In an advantageous alternative, not shown in the Figures, spring 71 includes, side by side, a plurality of pivot guides 73, each formed of an eye arranged to cooperate with the secondary pivot 72 of inertia block 4, each eye representing a particular, memorizable and reproducible adjustment, which allows easy factory pre-adjustment. These eyes 73 may be arranged in a line, staggered, or other arrangement, and are preferably referenced to facilitate assembly. This arrangement is preferable to the index arrangement, since it avoids any pressing on the spring.

The means of generating at least one variable magnetic field for a watch is preferably formed by permanent magnets 12, which are arranged on both sides of a chamber 8, in which the peripheral portion 30 of each inertia block 4 moves at certain speed ranges, said permanent magnets 12 being of opposite polarities in pairs, on both sides of said chamber 8.

Preferably, to avoid creating interference with the timepiece movement or mechanism, chamber 8, in which the magnetic field is created, is delimited by a magnetic insulation screen 9. Preferably, these permanent magnets 12 are arranged at the inner periphery 11 of a yoke 19 surrounding chamber 8, said yoke 19 preferably being delimited by said magnetic insulation screen 9 and the permanent magnets 12 are aligned in a substantially parallel direction to first pivot axis D1, on both sides of chamber 8. In a non limiting example seen in FIGS. 2 and 3 to 5, chamber 8 is delimited by a yoke 19 including two top 16 and bottom 17 yoke flanges, connected by a yoke ring 18.

In a particular embodiment, seen in these Figures, chamber 8 revolves about first pivot axis D1.

The variable magnetic field created inside the chamber can be generated in various ways. For a static timepiece, such as a pendulum, or for a musical box, the use of mains-operated or battery powered electro-magnets may be envisaged.

Thus, preferably, chamber 8 includes, at the inner periphery 11 thereof, a plurality of permanent magnets 12 arranged to create the magnetic field. Preferably, these permanent magnets 12 are arranged to create, in chamber 8, parallel field lines to the first pivot axis D1 of wheel set 3. The magnetic field in chamber 8 or in the air gap is thus axial and the governor has an axial flux.

In a particular embodiment, as seen in FIG. 6, the permanent magnets 12 are arranged in pairs on opposite surfaces 13;14 of chamber 8 and face each other, so as to create, in chamber 8, parallel field lines to the first pivot axis D1 of wheel set 3. Preferably, each inertia block 4 is also mobile between these two opposite permanent magnets 12 arranged on both sides of its trajectory.

In another variant, also seen in FIG. 6, an integer number of permanent magnets 12 are mounted on the same surface 13 or 14, with alternate polarities, so that the magnetic field through which each inertia block 4 passes during its trajectory is an alternate magnetic field of maximum intensity. The magnetic field is under a given pole in a first direction, and under the immediately proximate pole in the opposite direction. Thus, when wheel set 3 pivots, each inertia block 4 experiences a periodic, harmonic field of sinusoidal shape. In particular, yoke 19 includes, on either side of chamber 8, a first flange 16 carrying a first series of permanent magnets 12 and a second flange 17 carrying a second series of permanent magnets 12, and first flange 16 and second flange 17 each include an integer number of permanent magnets 12, which are mounted with alternate polarities at the periphery of the flange concerned, so that the magnetic field seen from a peripheral portion 30 of the moving inertia block 4, is an alternate magnetic field.

In another variant, not illustrated in the Figures, the permanent magnets 12 are mounted on the same surface 13 or 14, with non-alternate polarities, in a circular repetition from the centre, with variable total angle, radius and occurrence, so that the magnetic field seen from a peripheral portion 30 of the moving inertia block 4 during the trajectory thereof is an alternate variable magnetic field.

As already indicated hereinbefore, the variability of the magnetic field seen from the peripheral portion of an inertia block, is the condition for creating eddy currents, and energy dissipation. Consequently, although preferred embodiments are described here, it should be understood that the system also operates with a non-integer number of magnets or even with magnets that all have the same polarity. The examples proposed here are especially those which allow the best and most regular dissipation and are in no way limiting.

Figure 20:
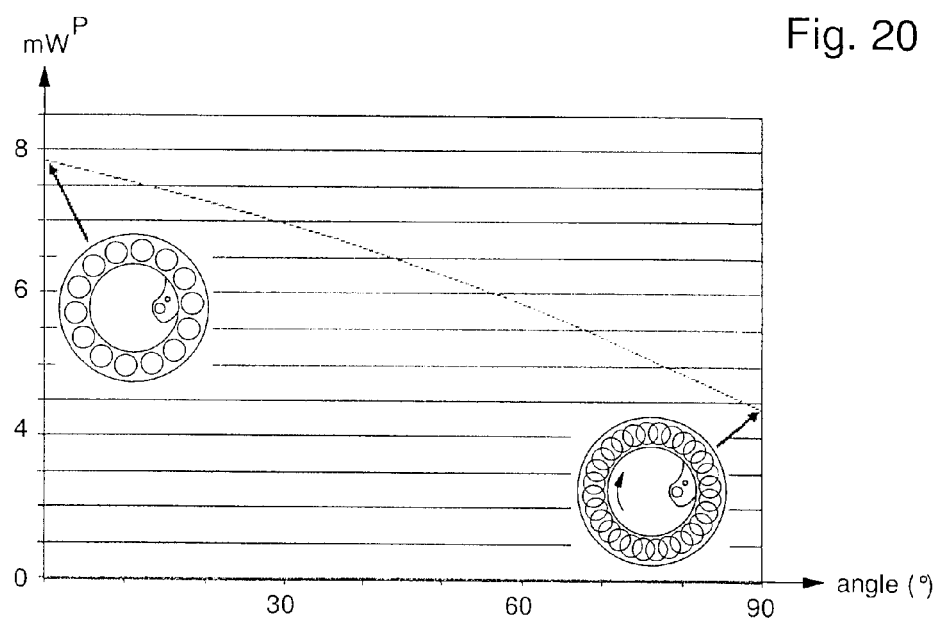
FIG. 20 is a curve illustrating the change in eddy current losses, all else being equal, as a function of the angular shift of a row of top magnets relative to a row of bottom magnets together generating the magnetic field for regulating speed in accordance with the invention.

In a particular embodiment, the first flange 16 and the second flange 17 are pivotally mobile in relation to each other about first pivot axis D1 in order either, according to their relative position, to align the field lines parallel to said first pivot axis D1, or orient them obliquely, at the surface of a cone or cylinder of revolution about the first pivot axis D1, relative to the latter. Obtaining field lines in a helix or cone allows the energy dissipation to be varied and regulation to be adjusted as well as possible. This arrangement may also allow better deployment of inertia blocks 4. The curve of FIG. 20 illustrates the change in eddy current losses in a completely deployed position of the inertia blocks, all else being equal, as a function of the angular shift of first flange 16 relative to second flange 17.

In another particular embodiment, first flange 16 and second flange 17 are mobile in translation or pivotally mobile relative to each other in the direction of the first pivot axis D1 so as to modify their air gap value.

In another particular embodiment, first flange 16 and second flange 17 are mobile in translation and/or pivotally mobile relative to each other in the direction of first pivot axis D1, due to the effect of peripheral portion 30 of inertia block 4 penetrating their air gap, for example with a biconical part or a corner of said peripheral portion tending to move the flanges apart, particularly against a spring which returns them towards each other up to a stop position.

In another particular embodiment, first flange 16 and second flange 17 pivot relative to each other in the direction of first pivot axis D1, due to the effect of peripheral portion 30 of inertia block 4 penetrating their air gap, which will, for example, tend to pivot one mobile flange relative to the other which remains stationary.

In another particular embodiment, first flange 16 and second flange 17 are mobile in translation relative to each other in the direction of first pivot axis D1, or pivotally mobile relative to each other in the direction of first pivot axis D1, under the action of a barrel forming the energy source, to compensate for the strike barrel energy loss, in a similar manner to a power reserve mechanism.

This relative pivotal and/or translation mobility of the flanges, which either carry magnets as set out hereinbefore, or conductive elements, when the magnets are carried by inertia blocks 4, particularly allows adjustment of the tempo, in the case of application to a striking mechanism, as shown in the Figures.

In a particular embodiment, not shown in the Figures, the permanent magnets 12 are radially mobile relative to the first pivot axis D1. Thus, if the field layer, which is substantially cylindrical around first pivot axis D1, is moved away from axis D1 gradually as the pivoting speed of wheel set 3 increases, the braking torque is also increased if the pivoting speed of wheel set 3 increases. Advantageously, governor 1 includes means arranged to allow a radial movement of permanent magnets 12 and/or chamber 8 relative to the first pivot axis D1 as a function of the pivoting speed of wheel set 3, for example by using centrifugal force, or by using electric motorisation powered by induced eddy currents.

In a particular embodiment not shown in the Figures, governor 1 includes a means arranged to authorise a movement of revolution of permanent magnets 12 and/or chamber 8 about the first pivot axis D1 as a function of the pivoting speed of wheel set 3. In an advantageous embodiment, this movement of revolution occurs in the opposite direction to the pivoting direction of wheel set 3, so as to double the induced current and thus the associated braking.

In a particular embodiment, the dissipation of energy can be further improved by axially motorising the flanges or yokes carrying permanent magnets. In particular, the use of a differential gear enables the inertia blocks 4 and permanent magnets 12 to pivot simultaneously in opposite directions, which means that the same dissipation and regulation can be envisaged using lower rotational speeds, which is advantageous as regards wear. Or, while maintaining the same speed, the eddy current dissipation can be doubled if the differential gear is, for example, designed such that the respective speeds of the magnets and inertia blocks are equal and in opposite directions.

Preferably, at least one inertia block 4, and advantageously each inertia block 4 is made of electrically conductive material or gold, or of copper or silver, or includes, in the part subjected to the magnetic field in chamber 8, a part made of electrically conductive material or gold, or of silver or copper, throughout the entire thickness traversed by the magnetic field in a direction parallel to the first pivot axis D1.

Figure 10:
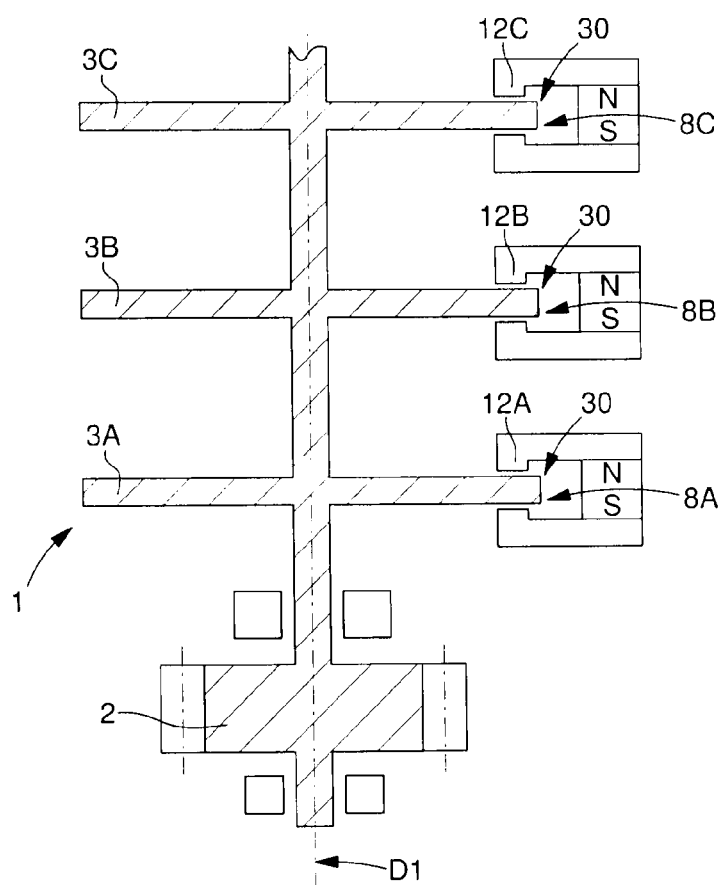
FIG. 10 shows a schematic view of a variant of the governor including several superposed wheel sets.

In a particular arrangement, as seen in FIG. 10, governor 1 includes a plurality of pivotally integral wheel sets 3, tiered in the direction of the first pivot axis D1, and each carrying at least one inertia block 4 mobile in a separate chamber 8 or common to the other inertia blocks 4. This arrangement may prove advantageous if horizontal space in the timepiece movement is limited.

In a particular embodiment of the timepiece wheel set or strike wheel set governor 1, shown in FIG. 1, at least one part of the peripheral portion 30 of wheel set 3 is mobile, not in a chamber, but in a slot 21 between two magnetic poles 22; 23 of opposite polarities comprised in a permanent magnet or electromagnet, slot 21 defining an orthogonal plane to the first pivot axis D1. Regulation can be achieved by an electromagnet 24 applied to one surface of wheel set 3 in proximity to the periphery thereof, said electromagnet 24 being powered by the current induced by the pivoting of wheel set 3. Preferably, this governor 1 then includes a frame forming a magnetic loop, for example made of steel or iron, and a magnetic circuit about slot 21, which is arranged in the frame. On both sides of slot 21, the magnetic circuit has poles of opposite polarity. The poles of the magnetic circuit are arranged in proximity to the periphery of mobile rotor 3. The latter either forms the rotating strike wheel set, or is coupled thereto, directly or via a train or another direct transmission. The pivoting of the strike wheel set under the action of the energy source causes the rotor to pivot and thus creates a variable magnetic field in the air gap between the poles. This variable magnetic field creates an induced electrical current which is also variable in a rotor made of electrically conductive or magnetic material.

This electric current may be used to drive a motor, the arbour of which is directly or indirectly coupled to the rotor, so as to drive or brake the rotor, according to the type of assembly. It may also be used to activate an electromagnet, or be applied to a surface of the rotor in proximity to the periphery thereof so as to brake the pivoting thereof pursuant to Laplace's law, or to activate a braking device of the strike wheel set.

Preferably, to be as compact as possible as well as having the smallest number of components, the rotor and the strike wheel set form a single piece once assembled, the frame includes permanent magnets of opposite polarity on both sides of its slot and regulation is performed by an electromagnet applied to a surface of the rotor in proximity to the periphery thereof, powered by the current induced by the pivoting of the rotor.

The braking achieved by Laplace forces and the electromagnet is substantially proportional to the pivoting speed of the rotor. In the event that the striking mechanism races, the speed differential results in a braking differential, which returns the pivoting speed of the rotor and thus of the strike wheel set, to a reference value, which not only counters the effects of mechanical racing, but also regulates the pivoting speed of the strike wheel set, and thus makes the musical or striking sequence perfectly paced, and pleasant for the user.

Figure 18:
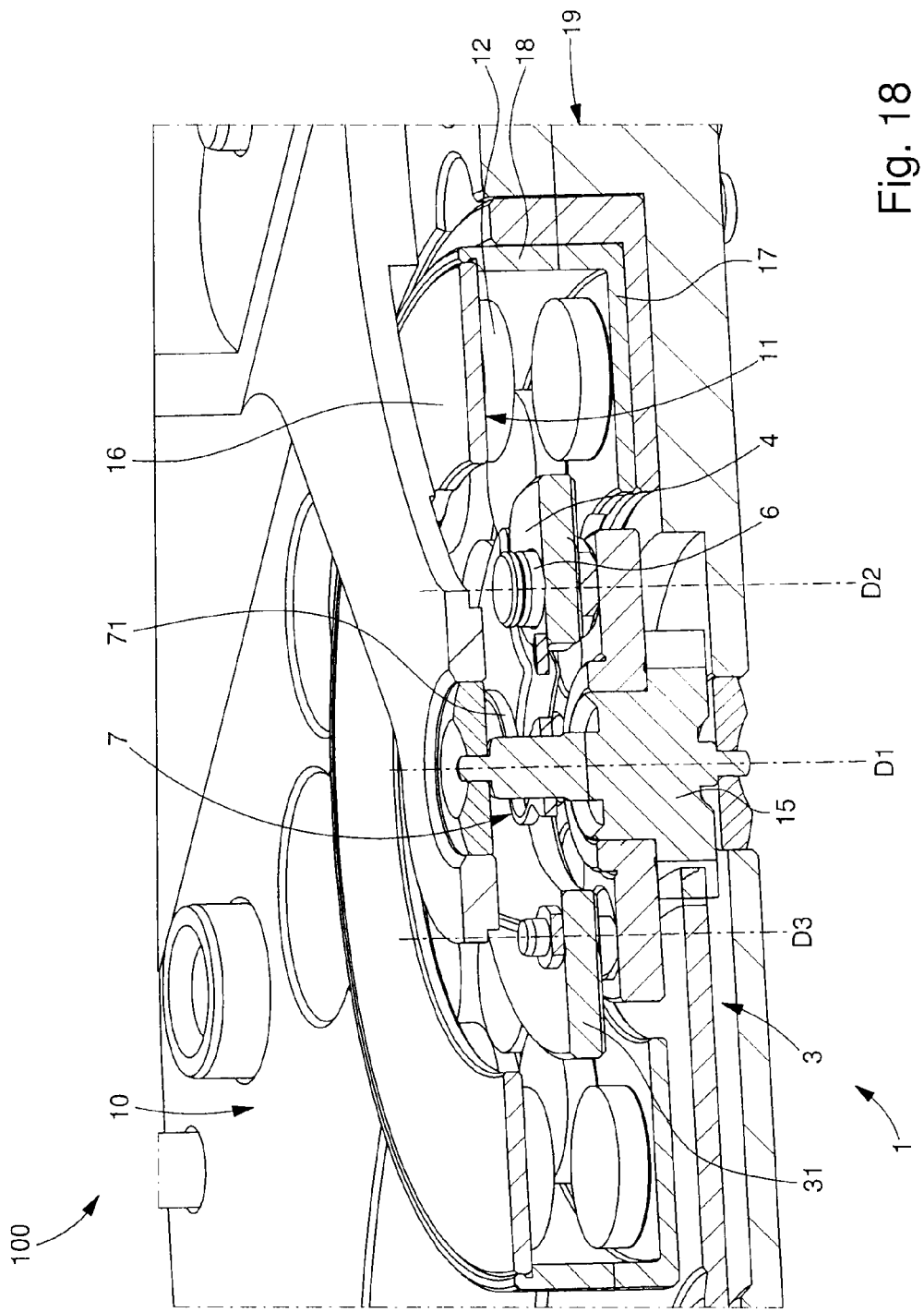
FIG. 18 is a schematic, perspective view of an improved version of the invention.

A simplified embodiment, as seen in FIG. 18, includes the following elements:

- Two ferromagnetic yoke flanges, 13 mm in diameter, made of "Mumetal" with 12 "Recoma 25" permanent magnets mounted with alternating axial magnetisation, with a diameter of 1.7 mm and thickness of 0.25 mm.
- Two copper inertia blocks, with an internal diameter of 2 mm, external diameter of 5.6 mm, and thickness of 0.9 mm.
- A brass inertia block support, 6 mm in diameter, with brass pins driven in as inertia block pivots.
- A yoke ring in the form of an external "CK45" steel tube, 2.5 mm in length, to ensure the continuity of the magnetic flux induced by the permanent magnets. Said yoke ring thus forms a shield.
- Two pins driven into the inertia blocks to secure the return spring.
- Two rubber O-ring type return springs connecting the arbour to the respective securing pins.

Although simplified, this version with return springs having no particular dimensions operates in a stable manner as regards the self-regulating speed of the system.

It is important to specify that the symmetry of the inertia blocks and return springs is of great importance to prevent unbalances and oscillations. Indeed, the inertia blocks could move off-centre with different angular movements due to a lack of symmetry and in the worst case, only have one inertia block in angular motion. Further, the springs are coupled to the central arbour. Unlike a single spring connecting the two inertia blocks but with no connection to the central arbour, this solution prevents any asymmetry and stops the two inertia blocks oscillating about the central arbour.

A particular, more elaborate version, able to satisfy the regulation conditions which the invention proposes to ensure, is illustrated in FIG. 18 and includes:

Two ferromagnetic stator yoke flanges made of "AFK502" FeCo. Each yoke flange carries 14 permanent magnets, 1.3 mm in diameter, 0.25 mm thick, of the "VACODYM 655 HR" NdFeB type, in alternating axial magnetisation.

Two inertia blocks are chosen to be made of silver because of its very low electrical conductivity.

The magnetic air gap, i.e. the axial distance between the two layers of magnets, is reduced in order to increase induction in the air gap at the inertia blocks. The thickness of the inertia blocks is 0.3 mm and the mechanical air gap between the magnets and inertia blocks is 0.12 mm.

The dimensions of the device are adapted to the space available inside a musical watch and the external diameter is limited to 8.4 mm and the height to 1.35 mm.

The spring is sized to balance the centrifugal force for any inertia block angular position at a speed of 3100 tr/mn.

The results conform to expectations: low speed variation, less than 3% of the nominal speed, and high power dissipation, higher than 6 mW.

Figure 19:
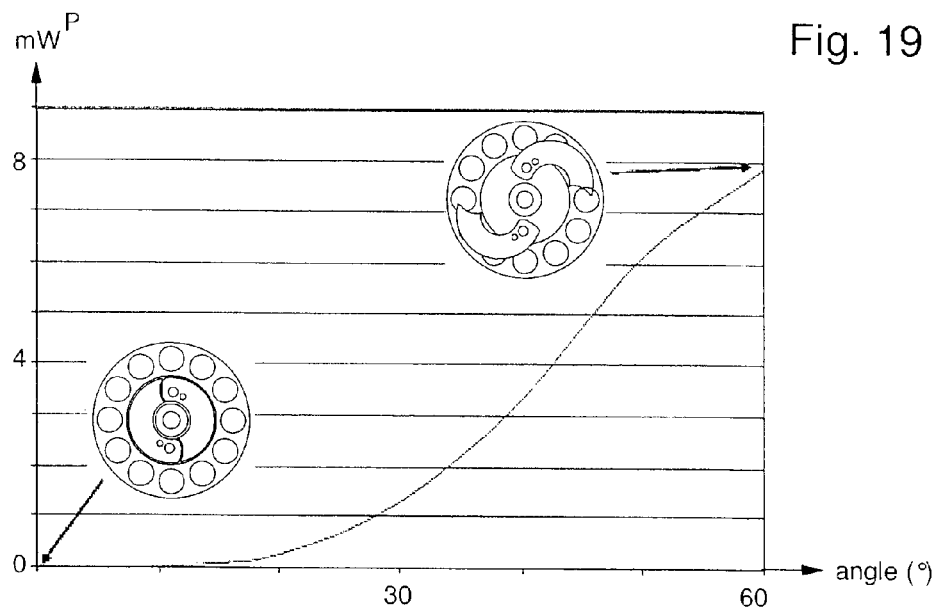
FIG. 19 is a curve illustrating the change in eddy current losses as a function of the angular position of the inertia blocks on their respective pivot, in the FIG. 18 embodiment.

The curve of FIG. 19 illustrates the change in eddy current losses as a function of the angular position of the inertia blocks on their respective pivot, in this preferred embodiment.

It can be seen that when the inertia blocks are close together, the power dissipated by eddy currents is zero. Thus, the system does not brake below the nominal speed.

The characteristics of the return spring are determined by balancing the centrifugal force, acting on the inertia block at nominal speed, at the point of attachment of the spring. Thus, the necessary spring rigidity and spring preload have respective values of 0.0014 N/mm and 0.006 N in this case.

It is also possible to determine the radial position of the end of the spring at rest and the preload distance which respectively have values of 0.93 mm and 0.44 mm. It should also be specified that the spring is held by the central arbour but is free to rotate. Thus, the return force of the spring is always directed towards the centre of rotation of the system.

FIG. 20 shows the power dissipated for a nominal speed of 3100 rpm with the inertia blocks completely deployed as a function of the angular shift of the top yoke magnets. This angular shift corresponds to a magnetic phase shift between the top yoke magnets and the bottom yoke magnets. It should be noted that the maximum dissipated power variation varies greatly as a function of magnetic phase shift, up to 90°. This behaviour allows fine adjustment of the regulation speed interval by allowing a slightly more rigid spring than that necessary to balance the centrifugal force at nominal speed. The eddy current dissipated power behaviour can thus be varied as a function of the angular position of the inertia blocks on their respective pivots. Thus, for the same dissipated power, phase shifting the top magnets relative to the bottom magnets means that the inertia blocks have to move further off-centre. With a suitable spring, the speed has to increase so that the inertia blocks reach their angular positions for dissipating the necessary power.

Magnetic interference in the timepiece balance spring, induced by this governor, is less than 1 nT.

Temperature affects the behaviour of the device via three elements: the magnets, the inertia blocks and the springs. It influences the remanent induction of the magnets and the resistivity of the inertia blocks. Thus, when the temperature increases, the inertia blocks must move slightly further off-centre to achieve the necessary power dissipation. If the rigidity of the relation between the eddy current braking torque and the rotational speed is very high, the influence of temperature on the regulation speed via the magnets and inertia blocks is negligible. "Enlivar" type materials may advantageously be used to reduce the influence of temperature on the modulus of elasticity of the spring, and thereby reduce the influence of temperature on the rigidity of the spring preload.

In another embodiment of the invention which does not rely on eddy currents, wheel set 3 includes similarly pivotally mounted inertia blocks, returned towards the first pivot axis D1 of centrifugal force compensating means formed by return means 7, in this case one or several springs 71, in accordance with the features set out hereinbefore. In addition to this structure, device 1 then includes a braking means which acts when the peripheral portion 30 of inertia blocks 4 passes from the first volume VI to the second volume VE of FIG. 14, which then no longer necessarily includes a magnetic field 8.

This braking means may be formed, either by air braking means, for example by deploying an aero brake above reference speed ωc, or dry braking means, for example by friction between peripheral portion 30 of inertia blocks 4 and a braking torque surface. Particularly, this surface is arranged so that the braking torque applied increases with the radius from the first pivot axis D1, for example with roughness that increases with distance from said first pivot axis D1.

Here too, preferably, the centre of inertia of each inertia block 4 is further from the first pivot axis D1 than the primary pivot 6 of the inertia block 4 concerned.

Preferably, the secondary pivot 72 of each inertia block 4 is further from the first pivot axis D1 than the primary pivot of the inertia block 4 concerned.

Naturally this purely mechanical embodiment may also be combined with the eddy current braking torque embodiment.

Governor 1 according to the invention may operate in two opposite pivoting directions, referenced A and B in FIG. 13. The direction of operation produces different effects, insofar as the results of the forces applied to the system are different.

Returning to the example embodiment illustrated in the Figures, where the second volume VE is external to first volume VI, where inertia blocks 4 are at least partially conductive, and where a magnetic field is present in chamber 8 during pivoting in direction A, the inertia blocks 4 move apart easily, and enter the variable magnetic field area, thus allowing eddy current energy dissipation.

In the opposite pivoting direction B, in a transitory mode at the start of their rotation, inertia blocks 4 are retained by a force due to acceleration, due to the induced rotation of the inertia blocks about their pivoting point, which is not identical to their centre of inertia, which is added to the return force of the pre-wound springs 71 and which resists the centrifugal force. Consequently, it is more difficult for the inertia blocks to move away from pivot axis D1 of wheel set 3 and less easy to enter the magnetic field area. This dynamic effect thus resists the centrifugal force, unlike the pivoting of wheel set 3 in direction A, where the forces are added to each other.

The sizing of the system must take account of magnetic field leaks, in particular at the axial part of governor 1. These leaks create a force of magnetic origin, which tends to move the inertia blocks away from axis D1 if governor 1 is pivoting in direction A, and to move them closer to axis D1 in the opposite case. The intensity of this force increases with pivoting speed, and the force is far from negligible in the assessment of high rotational speed forces, particular around 3000 rpms.

An aerodynamic effect should also be noted, known from former governors with air braking inertia blocks, and which, although small, should also not be ignored in the calculation of the magnets and inertia blocks.

The quality of the transitory wheel set acceleration phase depends on proper sizing of the springs and their preload conditions.

In a variant of the invention that is not illustrated in the Figures, these dynamic forces and/or forces connected to magnetic field leaks are used to allow the shape of the inertia blocks to change during operation, which further broadens the range of regulating possibilities.

In another variant of the invention, governor 1 does not include return means 7, springs 71 or similar elements and the centrifugal force on the inertia block is calculated to compensate for the force due to eddy currents.

In yet another variant, one part of inertia blocks 4 can be kept permanently in the air gap at chamber 8, so that, as soon as wheel set 3 starts to pivot, eddy currents are created and enter into the assessment of forces applied to inertia blocks 4, and thus indirectly to wheel set 3.

In short, the invention provides the conditions for very good speed regulation, by dissipating a large amount of energy, with a simple and very reliable mechanism.

It is also possible, depending upon the sizing adopted, to devise a system according to the principle of the invention, but which, conversely, does not use much energy, and for which the dominant regulating effect is the net force produced by the eddy currents.

With a single mechanism, it is thus possible and may be advantageous, to have at least two regulating possibilities, with different features, depending upon the selected pivoting direction.

In a particular variant of the invention, energy dissipation occurs in a liquid medium, particularly in a viscous medium.

Governor 1 according to the invention can thus operate in a liquid such as oil, since it is possible to make frictionless sealed mechanical connections between various dry and lubricated mediums. Indeed, it is particularly advantageous to combine a variable magnetic field effect with the effects resulting from hydrodynamic phenomena.

The invention further concerns a musical or striking mechanism 10 for a timepiece or musical box, including an energy source or a barrel, and a means 2 of transmitting mechanical torque from the energy source or barrel to a wheel set for generating music or a strike wheel set, and wherein the transmission means 2 drives at least one wheel set 3 comprised in a timepiece wheel set or strike wheel set governor 1 according to the invention.

The invention further concerns a timepiece or musical box including a wheel set for generating music or a strike wheel set, and which includes a musical or striking mechanism 10 of this type, and/or a timepiece wheel set or strike wheel set governor 1 of this type.

In a particular embodiment, the timepiece is a musical watch.

The invention further concerns an inertia governor, of identical composition to the timepiece wheel set or strike wheel set governor described hereinbefore, for other applications than regulating a strike or music mechanisms, for example, within the field of horology, for regulating movement, or in other fields than that of horology, for regulating the speed of any mechanism pivoted by an energy source delivering a variable torque, and more generally, any system for measuring and/or displaying time. The following mechanisms may be cited: chronographs, chronometers, mechanisms for regulating the speed of motion of a lever, for example in an instantaneous date mechanism, automaton mechanisms having the possibility of varying speeds between distinct movements, alarm, grand strike, chime or minute repeater mechanisms, musical boxes and suchlike, with pinwheel sets or air mechanisms, or also mechanisms with mechanical inertia centres. This list is in no way limiting.

The invention further concerns a spring of the same type as spring 71 as it was described hereinbefore, for other applications than those described here and in particular for an inertia governor.

In short, the invention proposes the preferred utilisation of a magnetic governor for regulating a striking mechanism.

The application of a magnetic governor to a striking mechanism is novel. Unlike known governors for control mechanisms, and thus transmitter circuits intended to guarantee a determined frequency for a timepiece mechanism, according to the invention, the magnetic governor behaves as a receiver, and uses energy. It controls the rotational speed of a rotating striking train, in particular a strike wheel set, at a reference speed, by lowering the speed, if it is higher than the reference value, and converting the surplus kinetic energy into stored and/or used energy.

A magnetic governor necessarily includes magnets and/or electromagnets, which may lead to the preferred use of certain materials, which are less sensitive to magnetic fields, to avoid the effects of interference. In particular the use of a silicon balance is preferred here. This is also the reason for preferring the particular version of chamber 8, which is delimited by a magnetic insulation screen 9, made of non magnetic material and forming a magnetic shield, and which causes the least interference in the timepiece environment and does not disrupt the operation of the movement. Chamber 8 is also made in an annular shape with orifices restricted to the passage of arbour 15 of wheel set 9 for this purpose.

The governor according to the invention is advantageously constructed using design principles similar to known governors: with close pivoting speed and equivalent braking power, but this novel governor does not have the drawbacks of those of the state of the art.

The use of this magnetic governor provides a silent mechanism with an extremely precise speed. Indeed, the variable eddy current brake achieved by the invention is sufficient to stabilise the pivoting speed of wheel set 3, without any contact, therefore it makes no noise, or very little noise.

The invention enables the watchmaker to adjust the braking torque, if, for example, chamber 8 of the first embodiment is devised so that the distance between surfaces 13 and 14 can be adjusted, for example with an embodiment wherein one and/or the other of yoke flanges 16, 17 are fitted or even better screwed onto yoke ring 18, or, in the second embodiment, if the air gap of slot 21 between magnetic poles 22 and 23 is adjustable.

The repeatability of the regulated speed during assembly is far better than in existing systems.

Speed stability during ageing is made much more reliable by the removal of friction and shocks.

The speed of wheel set 3 is satisfactorily regulated, even if the barrel torque varies by half during letting down.

The key elements of this governor are, on the one hand, the inertia block return spring which determines the regulating speed and, on the other hand, the permanent magnets and the electrically conductive inertia blocks which characterize the dissipated power and hence the braking torque.

This governor is particularly reliable, which is essential for a timepiece product.

This device with off-centre inertia blocks is a novel design which characterizes the rigidity of the relationship between the braking torque and regulating speed and uncouples the rotational system from the magnetic brake for speeds lower than the nominal speed.

In short, the advantages provided by the invention are numerous:
- very precise pivoting speed, particularly regulated at less than 3%;
- silent operation;
- reliability through absence of wear;
- easy adjustment during assembly;
- no uncertainty during development as regards the definition of amplitude/speed;
- broad range of operating torque for the same speed.

What is claimed is:

1. A timepiece wheel set or strike wheel set governor for regulating the pivoting speed of a wheel set about a first pivot axis, around a reference speed, wherein said wheel set is driven, via transmission means, by an energy source delivering a mechanical torque, said wheel set includes at least one inertia-block comprising a peripheral portion and pivotally mounted about a primary pivot defining a second pivot axis parallel to said first pivot axis and at a distance therefrom, wherein said governor includes a means of returning said at least one inertia block towards said first pivot axis, and wherein said at least one inertia block is arranged so that, when said wheel set pivots at a speed lower than or equal to said reference speed, said at least one inertia block remains confined within a first volume of revolution about said first pivot axis, and, when said wheel set pivots at a higher speed than said reference speed, said at least one inertia block is engaged, at least in a peripheral portion thereof, in a second volume of revolution about said first pivot axis contiguous with said first volume of revolution, and said governor including regulating means arranged for braking said wheel set and returning the pivoting speed thereof to said reference speed, and for dissipating the surplus energy, and said peripheral portion of said inertia block cooperates in said second volume of revolution with said regulating means wherein said peripheral portion of said inertia block is, either electrically conductive and said regulating means is formed by a means of generating at least one variable magnetic field in a chamber at least partially delimited by magnetized parts, said variable magnetic field including field lines oriented so that the interaction between said peripheral portion and said magnetic field generates eddy currents that tend to brake said wheel set by resisting the pivoting thereof, or wherein said peripheral portion is made of magnetized material, and the pivoting movement of said wheel set and said inertia block creates a variable, or alternate, or sinusoidal magnetic field in a chamber at least partially delimited by conductive parts, the interaction of which with said magnetic field generates eddy currents that tend to brake said wheel set by resisting the pivoting thereof.

2. The timepiece wheel set or strike wheel set governor according to claim 1, wherein said second volume of revolution about said first pivot axis is contiguous with and external to said first volume of revolution.

3. The timepiece wheel set or strike wheel set governor according to claim 1, wherein said second volume of revolution about said first pivot axis is contiguous with and internal to said first volume of revolution.

4. The timepiece wheel set or strike wheel set governor according to claim 1, comprising a braking means which acts when said peripheral portion of inertia blocks passes from said first volume to said second volume to apply a braking torque to the peripheral portion of said inertia blocks so that the braking torque applied intersects with a radial position of each said inertia block from the first pivot axis at the centre of said second volume.

5. The timepiece wheel set or strike wheel set governor according to claim 1, wherein said chamber is delimited by a magnetic insulation screen, made of non-magnetic material, forming a magnetic shield.

6. The timepiece wheel set or strike wheel set governor according to claim 1, wherein, when said wheel set pivots at a speed lower than or equal to said reference speed, said return means is arranged to keep said at least one inertia block confined within said first volume of revolution and, also, when said wheel set pivots at a higher speed than said reference speed, to allow said at least one inertia block to engage, at least in a peripheral portion thereof, in said second volume of revolution.

7. The timepiece wheel set or strike wheel set governor according to claim 1, wherein said inertia block comprises a secondary pivot defining a third pivot axis parallel to said first pivot axis and said second pivot axis, and wherein said return means is an elastic return means, and exerts a return force, in the direction of said first pivot axis, on said secondary pivot, and wherein said return means includes a first pivot guide about a main pivot or arbour comprised in said wheel set about said first pivot axis, and which includes at least a second pivot guide about said secondary pivot comprised in said at least one inertia block about said third pivot axis.

8. The timepiece wheel set or strike wheel set governor according to claim 1, wherein said wheel set includes a plurality of said inertia blocks arranged equidistantly about said first pivot axis, and wherein said return means is an elastic return means including a first pivot guide about a main pivot or arbour comprised in said wheel set about said first pivot axis, and includes a second pivot guide about a secondary pivot comprised in each said inertia block about a third pivot axis specific thereto.

9. The timepiece wheel set or strike wheel set governor according to claim 7, wherein said elastic return means is formed by at least one spring which is assembled preloaded, by a value corresponding to a radial travel of said second pivot guide thereof, in a radial direction relative to said first pivot axis, when said spring is guided by said first guide thereof on said main pivot, between an uncoupled position of said spring and a position where said spring is coupled on said secondary pivot of said inertia block, said wheel set and said inertia block being in the stopped position, and said preload tending, in the coupled position of said spring, to draw said secondary pivot of said inertia block radially towards said first pivot axis.

10. The timepiece wheel set or strike wheel set governor according to claim 1, wherein, when said regulating means is formed by said means of generating at least one variable magnetic field, said generating means is formed by permanent magnets, which are arranged on both sides of the chamber in which said peripheral portion of said at least one inertia block moves, said permanent magnets being arranged on the inner periphery of a yoke surrounding said chamber.

11. The timepiece wheel set or strike wheel set governor according to claim 10, wherein said yoke includes, on both sides of said chamber, a first flange carrying a first series of said permanent magnets, and a second flange carrying a second series of said permanent magnets, and said first flange and second flange are pivotally mobile relative to each other about said first pivot axis, so as either, according to the relative position thereof, to align said field lines parallel to said first pivot axis, or to orient said field lines obliquely, at the surface of a cone or cylinder of revolution about said first pivot axis, relative to said first pivot axis.

12. The timepiece wheel set or strike wheel set governor according to claim 10, wherein said yoke includes, on both sides of said chamber, a first flange carrying a first series of said permanent magnets, and a second flange carrying a second series of said permanent magnets, and said first flange and second flange are mobile in translation relative to each other in the direction of said first pivot axis so as to modify the value of an air gap between said flanges.

13. The timepiece wheel set or strike wheel set governor according to claim 10, wherein said yoke includes, on both sides of said chamber, a first flange carrying a first series of said permanent magnets, and a second flange carrying a second series of said permanent magnets, and said first flange and second flange are mobile in translation and/or pivotally mobile relative to each other in the direction of said first pivot axis, due to the effect of said peripheral portion of said at least one inertia block penetrating an air gap between said flanges.

14. The timepiece wheel set or strike wheel set governor according to claim 10, wherein said yoke includes, on both sides of said chamber, a first flange carrying a first series of said permanent magnets, and a second flange carrying a second series of said permanent magnets, and said first flange and second flange are mobile in translation and/or pivotally mobile relative to each other in the direction of said first pivot axis, under the action of a barrel forming said energy source.

15. The timepiece wheel set or strike wheel set governor according to claim 10, wherein said permanent magnets are mounted to be radially mobile relative to said first pivot axis.

16. The timepiece wheel set or strike wheel set governor according to claim 9, wherein said spring is arranged to exert the return force, in the direction of said first pivot axis and towards said first pivot axis, on said secondary pivot to return said at least one inertia block towards said first pivot axis, and wherein said spring includes a first pivot guide arranged to cooperate with said main pivot as an additional guide, and includes at least one second pivot guide arranged to cooperate as an additional guide with said secondary pivot of said at least one inertia block.

17. The timepiece wheel set or strike wheel set governor according to claim 16, wherein the rigidity of said spring is defined such that a radial force applied to said inertia block, returned to said secondary pivot, is a substantially linear function of the angular position of said inertia block about said primary pivot on said second pivot axis, relative to the stopped position of said inertia block, and for which a zero value of said radial force corresponds, in absolute value, to said preload travel.

18. The timepiece wheel set or strike wheel set governor according to claim 9, wherein said spring is made of a micro-machinable material, or silicon, or quartz or a compound thereof, or of an at least partially amorphous material.

19. A musical or striking mechanism for a timepiece or musical box, including an energy source or barrel, and a means of transmitting mechanical torque from said energy source or said barrel to a wheel set for generating music or a strike wheel set, wherein said transmission means drives at least one said wheel set comprised in a timepiece wheel set or strike wheel set governor according to claim 1.

20. A timepiece or musical box including a wheel set for generating music or a strike wheel set, and further comprising a musical or striking mechanism according to claim 19.

* * * * *